United States Patent
Tams et al.

(10) Patent No.: US 6,279,037 B1
(45) Date of Patent: Aug. 21, 2001

(54) METHODS AND APPARATUS FOR COLLECTING, STORING, PROCESSING AND USING NETWORK TRAFFIC DATA

(75) Inventors: Jonathan Tams; Mark Adrian Pearce; Robin Iddon, all of Edinburgh; Ronnie Brown, Dunfermline, all of (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/131,717

(22) Filed: Aug. 10, 1998

(30) Foreign Application Priority Data

May 28, 1998 (GB) ................................................ 9811416

(51) Int. Cl.⁷ ................................................ G06F 15/173
(52) U.S. Cl. ........................................ 709/224; 709/223
(58) Field of Search .................................. 709/223, 224, 709/220

(56) References Cited

U.S. PATENT DOCUMENTS

| | | | |
|---|---|---|---|
| 5,101,402 | 3/1992 | Chiu et al. ............................... | 370/17 |
| 5,539,659 | * 7/1996 | Mckee et al. ......................... | 364/514 |
| 5,596,722 | * 1/1997 | Rahnema ......................... | 395/200.15 |
| 5,634,009 | 5/1997 | Iddon et al. ..................... | 395/200.11 |
| 5,724,263 | * 3/1998 | Raguram et al. ..................... | 364/552 |
| 5,841,981 | * 11/1998 | Kondo ............................... | 395/200.53 |
| 5,870,556 | * 2/1999 | Cote et al. ...................... | 395/200.54 |
| 5,887,136 | * 3/1999 | Yasuda et al. .................. | 395/200.34 |
| 5,966,509 | * 10/1999 | Abe et al. ......................... | 395/182.02 |
| 5,968,132 | * 10/1999 | Tokunaga et al. .................... | 709/247 |
| 6,014,727 | * 1/2000 | Creemer ............................... | 711/118 |

FOREIGN PATENT DOCUMENTS

| | | |
|---|---|---|
| 0 265 106 | 4/1988 | (EP) . |
| 0 810 755 | 12/1997 | (EP) . |
| 2 261 801 | 5/1993 | (GB) . |
| 2 295 299 | 5/1996 | (GB) . |
| 98/26541 | 6/1998 | (WO) . |

OTHER PUBLICATIONS

"RMON Overview", Chapter 2 SNMP, RMON, BOOTP, DHCP and RARP Concepts, pp. 1–19, downloaded from Internet site http://support.baynetworks.com on May 11, 1998.

(List continued on next page.)

Primary Examiner—Dung C. Dinh
Assistant Examiner—Kenneth W. Fields
(74) Attorney, Agent, or Firm—Michaelson & Wallace; Peter L. Michaelson; Janet M. Skafar

(57) ABSTRACT

Methods and apparatus for collecting, storing, processing and using data, such a RMON2 network traffic data, are described. Network traffic probes are identified and attempts are made to configure the identified probes to generate network traffic data sets which are as close to a preselected common data format as possible. Application layer traffic data is collected in addition to network layer traffic data when possible. In an RMON2 embodiment, the common data format includes the use of delta count values as opposed to absolute count values. The common data format of the present invention utilizes terminal count mode format as opposed to all count mode format for the presentation of RMON2 application layer information. To minimize the amount of data processing required to put a probe's network traffic data into the desired common format and to maximize the amount of information collected, network data is obtained from a probe using one of the available RMON2 table formats. In order to avoid various problems with known data aging processes used to limit the growth of network traffic databases, a database of collected network traffic information which includes multiple parallel sets of data stored at different resolutions is created and maintained. The data sets for each individual resolution are stored in a separate FIFO data structure and with the oldest data records in the FIFO being overwritten when allocated data space becomes fully utilized.

18 Claims, 9 Drawing Sheets

OTHER PUBLICATIONS

A. Bierman et al., "Remote Network Monitoring MIB Protocol Identifiers", *Network Working Group Requests For Comments 2074*, Jan. 1997, pp. 1–38.

S. Waldbusser, "Remote Network Monitoring Management Information Base Version 2, using SMIv2," *Network Working Group Request For Comments: 2021*, Jan. 1997, pp. 1–130.

S. Waldbusser, "Remote Network Monitoring Management Information Base," *Network Working Group Request For Comments: 1757*, Feb. 1995, pp. 1–91.

* cited by examiner

METHODS AND APPARATUS FOR COLLECTING, STORING, PROCESSING AND USING NETWORK TRAFFIC DATA

FIELD OF THE INVENTION

The present invention is directed to the collection, storage, processing and use of data in computer networks, and more specifically, to the collection, storage, processing and use of data relating to network traffic.

BACKGROUND OF THE INVENTION

The use of computer networks, and inter-connected groups of computer networks referred as intranets, continues to be on the increase. The World Wide Web (WWW), sometimes referred to as the Internet, is an example of a global system of inter-connected computer networks used for both business and personal pursuits. The increased use of intranets within individual businesses and the increased use of the Internet globally is due to the increased number of computer networks in existence and the ease with which data, e.g., messages and/or other information, can now be exchanged between computers located on inter-connected networks.

FIG. 1 illustrates an intranet 10 implemented using known networking techniques and three local area networks (LANS) 20, 30, 40. The intranet 10 may be implemented within a business by linking together physically remote LANS 20, 30, 40. In the intranet 10, each of the first through third LANS 20, 30, 40 includes a plurality of computers (21, 22, 23) (31, 32, 33) (41, 42, 43), respectively. The computers within each LAN 20, 30, 40 are coupled together by a data link, e.g., an Ethernet, 26, 36, 46, respectively. The first LAN 20 is coupled to the second LAN 30 via a first router 18. Thus, the router 18 couples data links 26, 36 together. Similarly, the second LAN 30 is coupled to the third LAN 30 via a second router 19 which couples data links 36 and 46 together.

As is known in the art, the transferring of data in the form of packets can involve processing by several layers which are implemented in both hardware and/or software at different points in a network. A different protocol may be used at each level resulting in a protocol hierarchy.

At the bottom of the protocol hierarchy is the network layer protocol. One or more application layer protocols are located above the network layer protocol. In the present application, when describing a protocol associated with a data packet, the protocol associated with the packet will be described in terms of the protocols and layers associated therewith.

For example, the annotation:
  <network-layer>/<application-layer 1>/ . . . /<application-layer N>
    is used to describe the protocol hierarchy of the top-level (application-layer N) protocol. As another example, consider a packet which uses the SNMP (Simple Network Management Protocol) running over UDP (User Datagram Protocol), running on an IP (Internet Protocol) network-layer protocol. Such a packet would be described herein as an IP/UDP/SNMP packet.

As networks have grown in size and the volume of data being passed over networks has increased, system administrators have been faced with the job of planning and maintaining networks of ever increasing size and complexity.

Network traffic information can be used when troubleshooting problems on an existing network. It can also be used when controlling routing on a system with alternative routing paths. In addition, information on existing or changing network traffic trends is useful when decisions on upgrading or expanding service are being made. Thus, information on network traffic is useful both when maintaining an existing network and when planning modifications and/or additions to a network. Given the usefulness of network traffic information, system administrators have recognized the need for methods and apparatus for monitoring network activity, e.g., data traffic.

Because intranets often encompass geographically remote systems and/or networks, remote monitoring of network traffic is often desirable.

In order to facilitate the monitoring of network activity, remote monitoring (RMON) devices, often called monitors or probes, are sometimes used. These devices often serve as agents of a central network management station. Often the remote probes are stand-alone devices which include internal resources, e.g., data storage and processing resources, used to collect, process and forward, e.g., to the network management system, information on packets being passed over the network segment being monitored. In other cases, probes are built into devices such as a routers and bridges. In such cases, the available data processing and storage resources are often shared between a device's primary functions and its secondary traffic monitoring and reporting functions. In order to manage an intranet or other network comprising multiple segments many probes may be used, e.g., one per each network segment to be monitored.

Network traffic data collected by a probe is normally stored internally within the probe until, e.g., being provided to a network management station. The network traffic data is usually stored in a table sometimes referred to as a management-information base (MIB) . Recently, RMON2 MIB standards have been set by the Internet Engineering Task Force (IETF) which increase the types of network traffic that can be monitored, the number of ways network traffic can be counted, and also the number of data formats which can be used for storing collected data. RMON2 tables may include a variety of network traffic data including information on network traffic which occurs on layers 3 through 7 of the Open Systems Interconnect (OSI) model. The particular network traffic information which is available from a probe will depend on which data table the probe implements and the counting method employed.

Currently, four different RMON2 matrix (or conversation) table types are possible: alMatrix, alMatrixTopN, nlMatrix, and nlMatrixTopN.

Complicating matters, alMatrixTopN tables support two counting modes of operation which affect the manner in which the counting of packets and bytes is performed at the various protocol layers. The first of these counting modes will be referred to herein as all count mode. In this mode, each monitored packet increments the counters for all the protocol layers used in the packet. For example, an IP/TCP/HTTP packet would increment the packet and byte counters for the IP, TCP and HTTP protocols. The second counting mode will be referred to herein as terminal count mode. In this mode, each monitored packet increments only the counter of the "highest-layer" protocol in the packet. For example, an IP/TCP/HTTP packet would increment the packet and byte counters for only the HTTP protocol. Note that the terminal count mode may only be used with the alMatrixTopN table. However, all count mode can be used with all the RMON2 tables discussed above including the alMatrixTopN table.

Accordingly, probes may now collect and store data in tables corresponding to any one of five different RMON2 formats. The five different RMON2 table possibilities are identified herein as alMatrixTopN(Terminal Count Mode), alMatrixTopN(All Count Mode), alMatrix, nlMatrix and nlMatrixTopN tables.

Numerous distinctions exist between the various types of tables that may be supported by an RMON2 probe.

Network-layer (nl) tables, e.g., nlMatrix, and nlMatrixTopN tables, count only those protocols which are deemed to be network-layer protocols. Network-layer protocols are the protocols which are used to provide the transport-layer services as per the well known ISO OSI 7-layer protocol model, and include, for example, such protocols as IP, IPX, DECNET, NetBEUI and NetBIOS among others. No child-protocols of the network-layer protocols are counted in network-layer tables.

Application-layer (al) tables, e.g., alMatrixTopN (Terminal Count Mode), alMatrixTopN(All Count Mode), and alMatrix tables, count any protocol that is transport layer or above, provided the probe knows how to decode the protocol. This includes, e.g., everything from IP through to IP/UDP/SNMP, Lotus Notes traffic, WWW traffic, and so on. Application-layer tables provide information on a superset of the protocols which the network-layer (nl) tables provide, by counting child-protocols of the supported network-layer protocols.

In addition to the different types of protocol data that will be monitored depending on whether a network layer (nl) or application layer (al) table is being supported, the method of counting data will vary depending on the supported table type.

The alMatrix and nlMatrix tables monitor conversations which occur in the network, and keep count of the total number of bytes and packets seen for each conversation for each monitored protocol since the probe was turned on. If the probe has been reset since it was turned on, then the counters store the number of bytes and packets seen since the last time the probe was reset. These kinds of counters will be refereed to herein as absolute counters. The entries in alMatrix and nlMatrix tables are ordered by address and protocol.

The alMatrixTopN and nlMatrixTopN tables also monitor all conversations which occur in the network, and also keep count of the number of bytes and packets seen for each conversation. However, there are several differences. MatrixTopN tables must be configured by the user or by a client program, and are configured to have a maximum number of entries and a time interval for which the table will be generated. Once configured, the probe will perform the following steps until the MatrixTopN table is destroyed (either by a request from the user or client program, or by the probe being turned off):

1. Monitor the conversations in the network, counting the packets and bytes seen over the specified time interval.
2. Once the time interval is reached, then generate a table of the top N conversations seen in the network. This table can then be retrieved by the user (or client program), and is held until the next table is generated, which then replaces the current table. The ordering in a MatrixTopN table may be either by the number of packets seen, or by the number of bytes seen.
3. Go back to step 1.

As MatrixTopN tables monitor the number of packets and bytes-seen over the specified time interval, with the counters being effectively reset each time a new table of the top N conversations is generated, the counters generated by MatrixTopN tables are referred to herein as delta counters.

Because intranets and the networks which comprise intranets are frequently implemented and modified over a period of time, a plurality of different probes, often supporting different data traffic table formats, will frequently be encountered in the same network. In some cases, a probe may have insufficient processing and data storage resources to support all but the least resource intensive data table format, e.g., an nlMatrix table. Accordingly, the information included in traffic data tables of probes may vary from probe to probe depending on the particular protocols monitored, the individual probe's available resources, and the MIB format implemented by the individual probes.

The numerous variations in data counting methods and monitored protocol layer information discussed above can cause network traffic data collected from probes to be difficult to compare, process and display in a manner that can be easily understood by a human.

One solution to the problem of different data tables, being supported by different probes in a network, is to use only probes which provide data in the same format. Unfortunately, this approach tends to be costly and often involves replacing existing probes, adding new probes, and/or using probes which at least in some locations, provide a greater data collection capability than required. Thus, for cost reasons, probe selection rarely tends to be a practical solution to resolving problems resulting from a lack of consistency among probe data collection and storage techniques.

While the recent addition of RMON2 support for including information about child protocols in at least some data tables, greatly increases the level of detailed information that can be collected regarding network traffic, it has lead to increases in probe data storage and processing requirements. As the volume of network and intranet activity continues to increase into the Gigabytes/sec range, space required to store detailed network traffic information for extended periods of time can become significant. While the data storage requirements for a probe maintaining network traffic data can be significant, the data storage requirements for a management system storing data obtained from several probes is many times greater.

One known technique for limiting the growth of a network traffic database is referred to as data aging. Data aging involves periodically scanning the stored data and, during the scan, data records that are older than certain preselected age limits are read and get combined, e.g., added together, to create an additional set of data records of lower resolution than the records used to create the additional set. The records used to create the lower resolution set of data records are then deleted from the original database. When this technique is used, there are normally multiple age limits set up, resulting in multiple data sets corresponding to different non-overlapping time periods. In such a system, the older the data records become, the lower the resolution of those records will be. Hence less disk space is required to store records corresponding to a fixed period of time, the longer in the past the fixed period of time occurred.

Unfortunately, the known data aging technique has several disadvantages, both from an implementation standpoint and from the standpoint of a human system administrator attempting to use the stored network traffic information.

From an implementation standpoint, the known system has the distinct disadvantage of requiring double buffering of the data while the aging process is being performed. Such double buffering is required so that accessing the data during aging will still give the correct results. Given that the size of the database to be aged can be quite substantial, double buffering presents obvious hardware disadvantages. From an implementation standpoint the known aging process also has the disadvantage of placing significant periodic demands for processing resources that can interfere, e.g., slow or delay, other processing tasks performed by a management station, while the aging operation is being performed.

The known data aging process results in multiple, non-overlapping data sets of differing resolutions corresponding to different time periods. From a human standpoint, this makes it difficult to review and compare data sets to detect, e.g., network traffic problems, since the data sets correspond to different time periods.

In view of the above discussion, it becomes apparent that there is a need for new and improved methods and apparatus for collecting and handling network traffic data from probes.

In particular, there is a need for methods of collecting network traffic data that minimize the number of different data formats and data tables which must be processed. In addition, there is a need for new methods and apparatus for processing data received in differing formats to produce a database of network traffic data which can easily be accessed by other applications and/or presented to a human administrator in a manner that allows for easy comparison and presentation of traffic data monitored on various network segments.

In addition, there is a need for methods and apparatus which are capable of limiting the growth of databases, e.g., network traffic databases, over time. It is desirable that the methods and apparatus allow for accurate access to the database at all times, once it is created. It is also desirable that the database methods not require double buffering of the data included in the database to support such access. In addition, if data sets of different resolutions are included in the database, it is desirable that the lower resolution data sets incorporate the information found in the higher resolution data sets and overlap for at least some period of time.

Data from different probes corresponding to a particular time period may not be received precisely at the same time by a monitoring device, e.g., due to network transmission delays, etc. Accordingly, it is also desirable that methods and apparatus for receiving and storing network traffic information be capable of compensating for such delays so that received network traffic data is stored and presented in a manner that accurately reflects the traffic in the time period that was monitored and not the time at which the traffic data was received by the monitoring station.

In addition to the above features, it is desirable that new methods of collecting, processing and storing network traffic data be compatible with existing probe data formats. It is also desirable that the new methods and apparatus be capable of being used with, or adapted to being used with, probe data formats that may be supported in the future.

In particular, it is desirable that that at least some new methods and apparatus be capable of working with network traffic data in a plurality of table and count formats including various RMON2 tables. It is also desirable that any such method and/or apparatus not require a specific one of the RMON2 tables to be used by a probe which would result in a constraint on RMON2 probe selection and probe resource requirements.

In view of the above, it is apparent that there remains considerable room for improvement in how network traffic data is collected, stored, processed and presented to network administrators and other individuals responsible for the design, maintenance and upgrading of networks and intranets.

SUMMARY OF THE PRESENT INVENTION

The present invention is directed to methods and apparatus for collecting, storing, processing and using data, e.g., network traffic data, in computer networks.

Several embodiments of the present invention are directed to dealing with the difficulties associated with collecting and processing network traffic data. As discussed above, one of the major problems encountered with collecting and processing network traffic data is the numerous different counting techniques and data table storage formats that may be used by various probes in the same system.

In order to provide a high degree of detailed information for subsequent applications, attempts are made by the method of the present invention to collect application layer traffic data as well as network layer traffic data.

To reduce problems due to different counting techniques and data table formats, the present invention processes collected network traffic data, as required, to place it into a common data format. The common data format is selected to provide a maximum degree of information in a format that is easy to use, e.g., by database generation and graphing application.

From a user standpoint, it was determined that, in at least one embodiment of the invention, it was desirable that the common data format include delta count values as opposed to absolute count values and that application layer information be presented in terminal count mode as opposed to all count mode.

In order to reduce the amount of processing required to put the data in the desired common format, and the temporary data storage requirements associated with such processing, the system of the present invention controls network traffic data probes to provide data in a format that is as close to the desired format as possible, given an individual probe's capabilities.

One specific embodiment of the present invention is directed to the use of RMON2 probes and RMON2 data tables.

In one such embodiment, to minimize the amount of data processing required to put a probe's network traffic data into the common format used by a management system of the present invention, and to maximize the amount of information collected, network data is obtained from a probe using one of the available RMON2 table formats. In accordance with the present invention the RMON2 format is selected in the following order of preference: alMatrixTopN(Terminal Mode), alMatrixTopN(AllMode), alMatrix, nlMatrixTopN and nlMatrix.

RMON2 alMatrixTopN(Terminal Mode) data tables satisfy the format requirements used in the present invention and therefore do not require conversion operation to be performed. In addition RMON2 alMatrixTopN(Terminal Mode) data tables include both application layer and network layer data. For these reasons, the RMON2 alMatrixTopN(Terminal Mode) data table is the most preferred of the RMON2 tables in the above discussed embodiment.

Once network traffic data is collected and placed in a common format, it is ready for use in generating displays and/or network traffic databases.

In one particular embodiment of the present invention, the network traffic data, in the common data format, is stored in a network traffic database to allow for future analysis such as baselining and troubleshooting.

The known database aging process is avoided by the system of the present, by creating and maintaining a database that includes multiple parallel sets of network traffic data at different resolutions. In accordance with the database generation and maintenance routine of the present invention, a data set for each different resolution is stored in a first-in, first-out (FIFO) data structure. The oldest records in the FIFO data structure are overwritten when there is no longer any unused storage space available for storing the records of the resolution to which the data structure corresponds.

Because the network traffic database of the present invention is not aged, the periodic processor loading associated with aging of databases is avoided. In addition, the need to double buffer the database data during an aging process is eliminated since no aging is performed.

The parallel database routines of the present invention also have the advantage of being well suited to a multiprocessor environment since each data set can be maintained and updated independently.

In the databases of the present invention, the database records at the different resolutions overlap covering the same time period. This makes it relatively easy for a system administrator to review database records corresponding to the same time period at different resolutions. This can facilitate a system administrator's attempts to identify network traffic problems and/or trends without the need to perform complicated processing when comparing or switching between data at different resolutions.

In addition to the above described features, many other features and embodiments of the present invention are described in detail below.

DETAILED DESCRIPTION

As discussed above, the present invention relates to methods and apparatus which can be used collect, store, and process data, e.g., data regarding traffic in a computer network or intranet. It is also directed to methods of presenting network traffic data in a format that can be easily understood by a person, e.g., an individual responsible for managing the computer network or networks being monitored.

Figure 1:
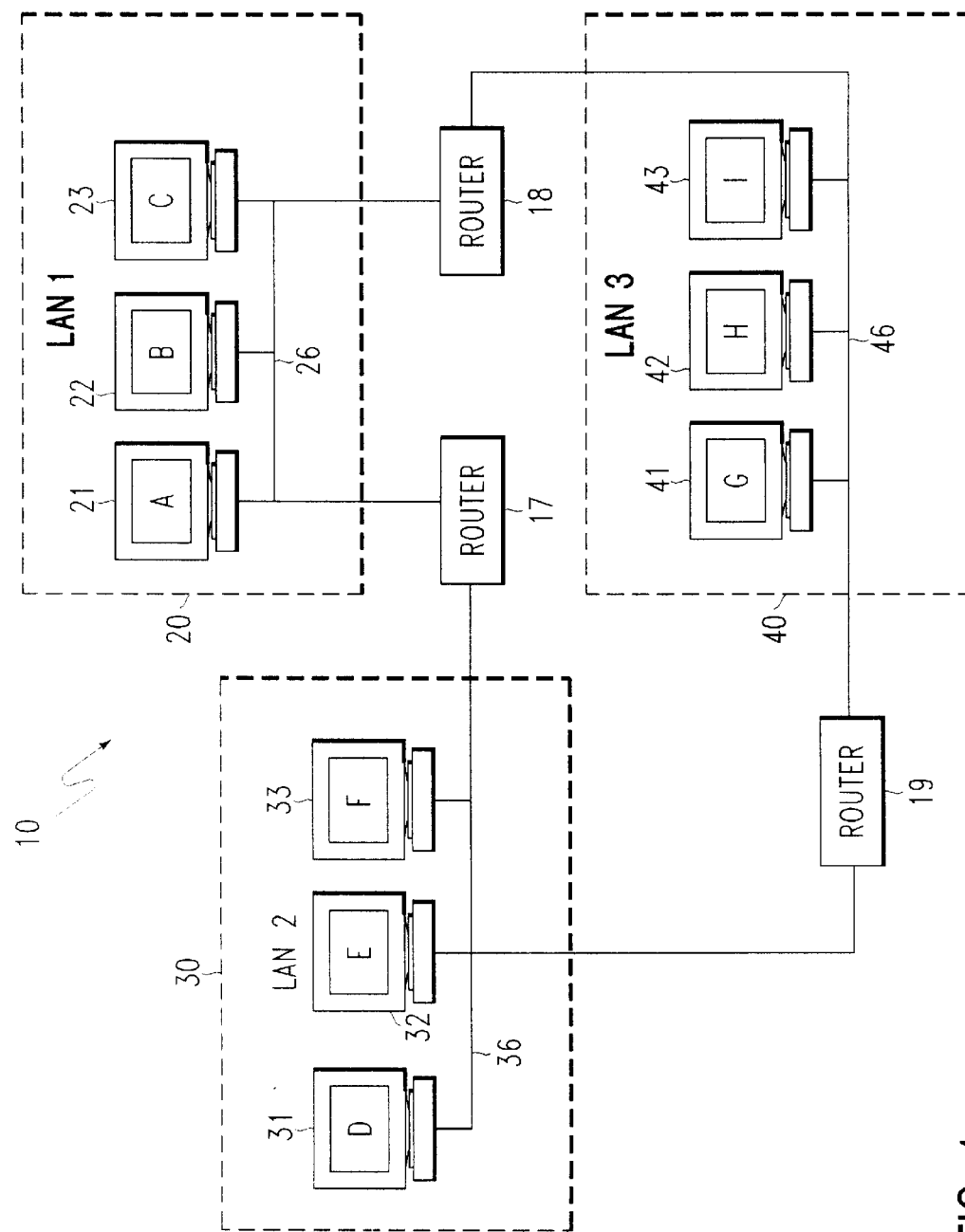
FIG. 1 is a block diagram of a known intranet arrangement.
Figure 2:
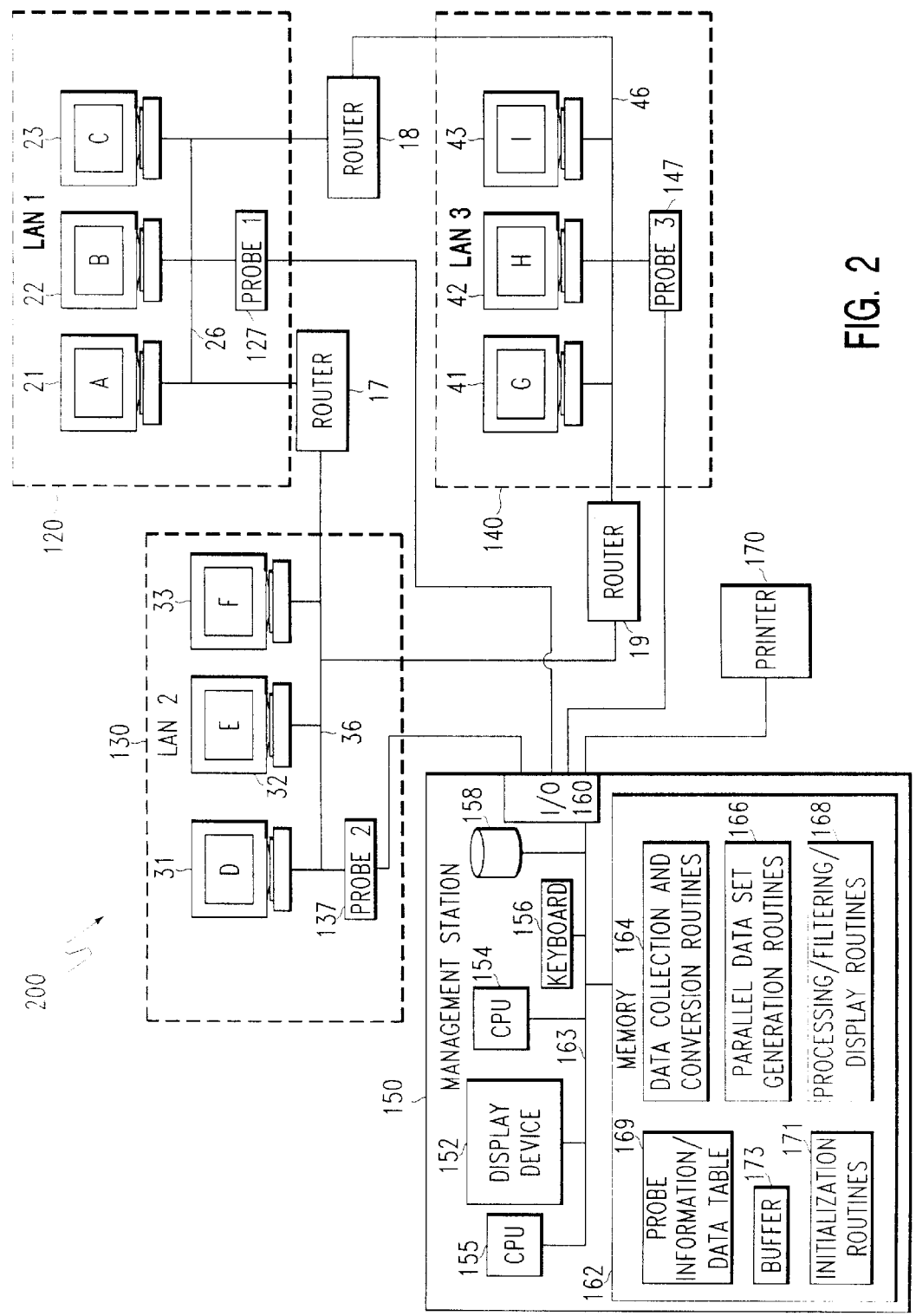
FIG. 2 is a block diagram of an intranet including a management system implemented in accordance with one embodiment of the present invention.

Referring now to FIG. 2, there is illustrated an intranet 200 implemented in accordance with one embodiment of the present invention. Various elements of the intranet 200 which are the same as, or similar to, the known intranet 10, are identified using the same reference numerals used in FIG. 1.

As illustrated, the intranet 200 comprises first through third LANS 120, 130, 140 each of which includes a plurality of computers (21, 22, 23) (31, 32, 33) (41, 42, 43), respectively. The computers within each LAN 120, 130, 140 are coupled together by a data link, e.g., an Ethernet, 26, 36, 46, respectively. The first LAN 120 is coupled to the second LAN 130 via a first router 17 which couples data links 26, 36 together. The first LAN 120 is also coupled to the third LAN 140 via a second router 18.

The second LAN 130 is coupled to the third LAN 130 via a third router 19 which couples data links 36 and 46 together.

Data links 26, 36 and 46 are network segments within the intranet 200. In order to obtain information on each of the network segments 26, 36, 46 probes 127, 137, 147 are included in each of the first through third LANs, respectively. Each probe is coupled to the data link, e.g., Ethernet, which is included in the LAN in which the probe resides. Because the first probe 127 is coupled to the first Ethernet 26 it can collect information about traffic on the network segment 26. Similarly, the second and third probes 137, 147 are able to collect information about traffic on the network segments 36, 46, to which they are coupled, respectively. In accordance with one embodiment of the present invention, the probes 127, 137, 147 collect and store network traffic data in one or more RMON2 tables (MIBs).

The probes 127, 137, 147 may include memory, a processor, an I/O interface device and a mass storage device, such as a disk drive. In one embodiment, probes 127, 137, 147 are implemented using known network traffic data probes.

In accordance with the present invention, each of the probes 127, 137, 147 is coupled to a management station 150 which also forms part of the intranet 200. The management station 150 includes a display device 152, one or more central processing units (CPUs) 154, 155, a keyboard 156, a mass storage device 158 for storing, e.g., a data base, and memory 162 which are coupled together by a bus 163. The mass storage device 158 may be, e.g., a disk drive or array of drives. In the embodiment illustrated in FIG. 2, two CPUs 154, 155 capable of operating in parallel are shown. However, in many embodiments, a single CPU 154 is used on a time shared basis, e.g., to perform database generation and maintenance operations.

The bus 163 couples the discussed management station components to an input/output (I/O) interface 160 used to connect the management station and its components to the first through third probes 127, 137, 147. The I/O interface 160 is responsible for interfacing between the various devices coupled thereto.

One or both of the management station's CPUs, 154, 155 can be used to control the operation of the management station 150 as a function of various routines stored in the memory 162. The use of one or both of the CPUs, in controlling the operation of the management station 150, depends on the implemented operating system. For exemplary purposes it will be assumed that only CPU 154 is used to control operation of the management station 150.

The routines, stored in the memory 162, include initialization routines 171, data collection and conversion routines 164, parallel data set generation routines 166, and processing/filtering/display routines 168. The various routines may be implemented as computer programs. In addition to the routines 171, 164, 166, 168, the memory 169 may include probe information and data tables received from the probes 127, 137 and 147.

The memory 162 may also include a buffer 173 for temporarily storing data tables converted to the common format of the present invention. The collected probe data stored in the buffer 173 is processed by the CPU 154 under control of routines 164, 166, 168 and stored in a network traffic information database located on the storage device 158 as will be discussed below.

The keyboard 156 can be used for inputting queries regarding network traffic information. Charts and statistics regarding network traffic information are generated by the CPU 154 in response to such queries using the data included in the network traffic database. The charts and statistics are displayed on the display device 152 and/or printed on a printer 170 coupled to the management station 150.

Figures 3, 4B:
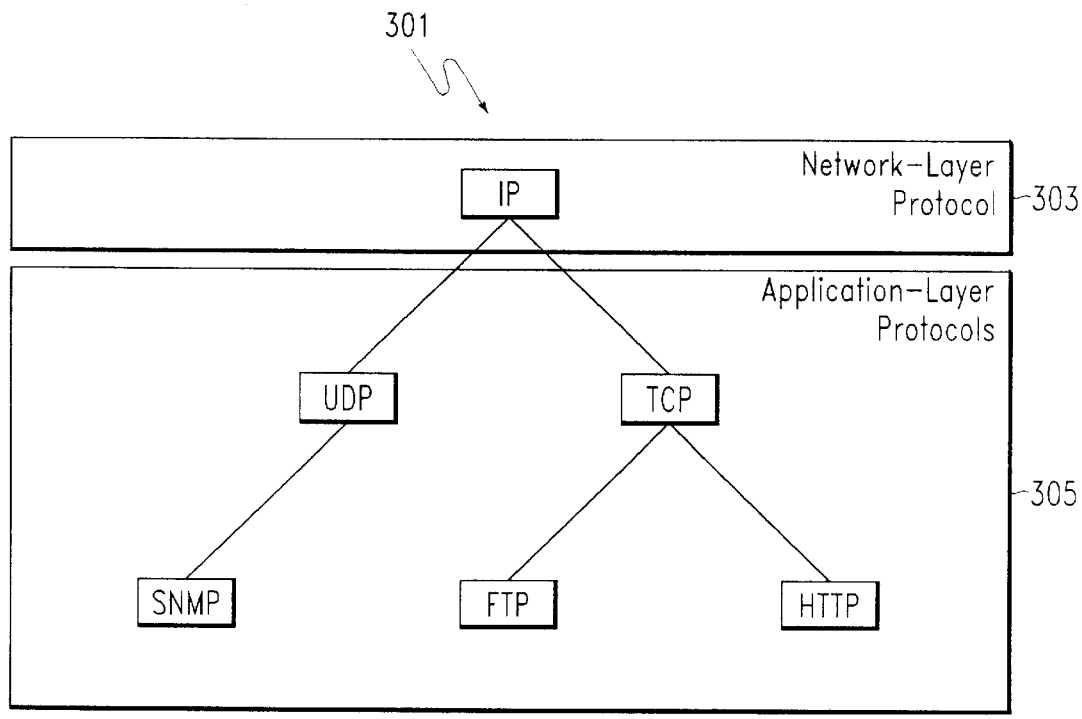
FIG. 3 is a diagram of a protocol hierarchy used in various examples discussed herein.
FIG. 4B is an exemplary probe information/data table created by executing the initialization routine illustrated in FIG. 4A.

FIG. 3 illustrates an exemplary protocol hierarchy in the form of a tree 301 which may be retrieved from one of the probes 127, 137, 147 for a monitored conversation between two devices included in the intranet 200. The hierarchy illustrated in FIG. 3 will be used in the discussion which follows to illustrate various points. Note that, while a probe 127, 137, 147 may support many thousands of protocols, only those protocols which have been seen for a particular conversation will be stored in the data table or tables supported by the probe and thus will be the only protocols which may be retrieved by the management station 150 from the probe for that conversation.

In the FIG. 3, diagram, the protocols shown are IP (Internet Protocol), UDP (User Datagram Protocol), SNMP (Simple Network Management Protocol), TCP (Transmission Control Protocol), FTP (File Transfer Protocol) and HTTP (Hyper-Text Transfer Protocol—also sometimes referred to as WWW (World Wide Web) traffic).

The tree 100 has been divided into two halves: the network-layer protocol 303 and the application-layer protocols 305. This division will be used in later examples.

The conversation for which the tree has been generated is a conversation between two devices e.g., computers A and B 21, 22, using the IP network-layer protocol.

The IP/UDP protocol is shown in a dotted box—this is to represent that, while the IP/UDP/SNMP packets were monitored by the probe 127, the probe 127 had the IP/UDP protocol turned off. This is a feature of RMON2, (the ability to turn off the monitoring of protocols), and means that any pure IP/UDP packets would not be counted. Thus, a count of any pure IP/UDP packets on the network segment 26 would not be supplied by the probe to the management station 150 on retrieval of the network traffic data from the probe 127. However, child protocols of IP/UDP (such as IP/UDP/SNMP) would continue to be counted and supplied to the management station 150 from the probe 127.

As IP/UDP is not being monitored by the probe, we can describe this tree using the following format:

IP
IP/UDP/SNMP
IP/TCP
IP/TCP/FTP
IP/TCP/HTTP.

As discussed above, networks may include a variety of probes 127, 137, 147, with differing capabilities and differing network data table formats. In accordance with the present invention, the management station 150 collects and processes network traffic data from the probes 127, 137, 147 included in the network. In order to simplify subsequent data processing operations, the network traffic data received from the probes is processed to place it in a consistent format that can be used to support queries, storage, and displaying of network traffic data in a format that is easy process and understand. By converting network traffic data into a consistent format at an early stage, processing components and modules, e.g., the parallel data set generation routines 166 and processing/filtering/display routines 168, can be isolated from the complexities associated with varying network traffic data formats encountered from probe to probe.

The inventors of the present application recognized that, for most purposes, what is of interest is the network traffic during a specific time interval and not the total amount of traffic monitored from the time a probe is turned on. Accordingly, in determining the common format into which network traffic data should be placed, it was decided that a delta counting, as opposed to absolute counting, technique should be used. In addition, it was decided that, for maximum flexibility, it was useful to obtain as much detail about network traffic as possible. Accordingly, it was decided that the common data format should include application layer protocol information when available. In addition, it was decided that it was more useful to have the data represented in terminal count mode, as opposed to all count mode.

Unfortunately, the only RMON2 table which satisfies the above discussed criterion selected for a common data format is the alMatrixTopN (terminal count mode) table. Because nlMatrix and nlMatrixTopN tables only include network layer traffic data, these two tables are considered the least useful and are not used unless the probe from which the data is being obtained does not support one of the three possible application layer tables.

To minimize the amount of data processing required to put a probe's network traffic data into the common format used by the management system 150, network data is obtained from a probe using one of the available table formats with the format utilized being selected in the following order of preference: alMatrixTopN(Terminal Mode), alMatrixTopN (AllMode), alMatrix, nlMatrixTopN and nlMatrix.

As discussed above, an alMatrixTopN(Terminal Mode) table has the advantage of requiring no format conversion operations.

The alMatrixTopN(AllMode) table requires a single conversion operation, i.e., an all count mode to terminal count mode conversion operation, to place it in the common format. Unlike absolute count to delta count conversion operations, as will be discussed below, terminal count conversion operations can be performed without the need to use the previously received data table. Accordingly, alMatrixTopN(AllMode) tables can be converted to the common format with a minimum of processing and memory requirements.

The alMatrix table is less desirable than the other application layer tables because it requires two conversion operations to place it in the common format. Furthermore, one of the conversion operations requires buffering of a retrieved data table for the duration of the data measurement interval thereby requiring more memory than is required to put the alMatrixTopN table in the common data format.

Identification of the probes which are coupled to the management system 150, the data tables they support, and the selection of the data table to be used with each probe occur during execution, by CPU 154, of a management station initialization routine 300. The routine 300 is one of the initialization routines included in memory segment 171.

Figure 4A:
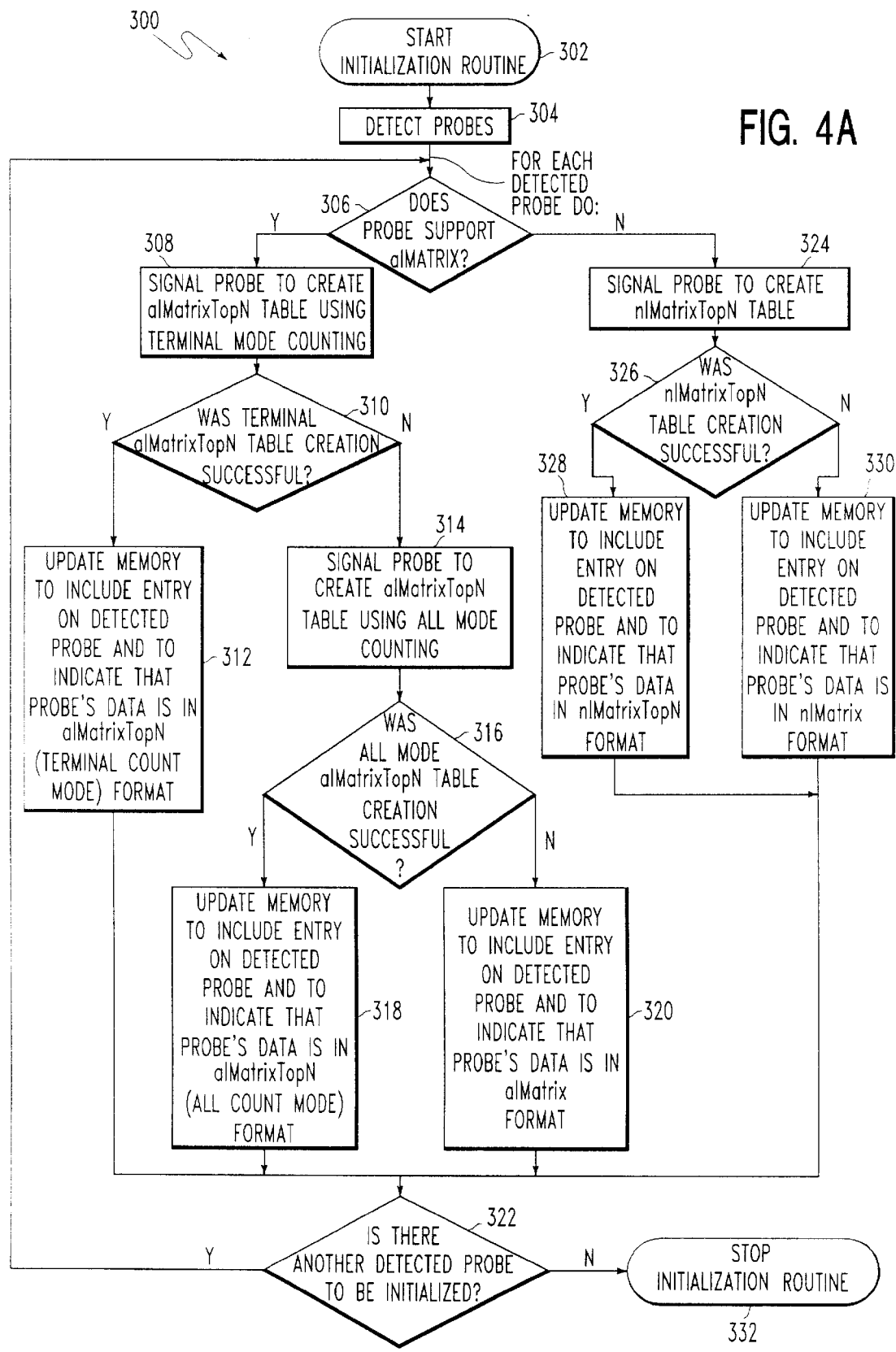
FIG. 4A is a flow chart of a management system initialization routine implemented in accordance with the present invention.

Operation of the management station 150 of the present invention will now be discussed with regard to the initialization routine 300 shown in FIG. 4A. The initialization routine 300 is performed by the management station, e.g., when the station is powered up or reset. The initialization routine 300 begins in step 302 wherein the initialization routines 171 is executed by the CPU 154.

In step 304, the management system 150 detects the probes 127, 137, 147 which are coupled to the system 150. The detection of the probes may be done, as known in the art, by transmitting a signal querying for a response from probes which are present.

Once a probe is detected, the initialization routine determines the network traffic table format that is to be used with the detected probe and stores that information in memory for future use, e.g., in determining what if any format conversions need to be performed on data obtained from the probe.

For each detected probe 127, 137, 147 the initialization process proceeds through steps 306 through 322. The path taken through these steps determines which table format will be used with the identified probe.

In step 306 a determination is made as to whether or not the probe being initialized supports application layer tables, i.e., if the probe has alMatrix capability. In one embodiment, alMatrix support is determined by querying a probeCapabilities object supported by the detected probe and monitoring the probe's response.

If in step 306 it is determined that the probe includes alMatrix support, operation proceeds to step 308. In step 308, the management station 150 signals the probe to create an alMatrixTopN table using terminal mode counting. If, in step 310, it is determined, e.g., by receipt of a signal from the probe, that creation of the desired alMatrixTopN table was successful, operation proceeds to step 312. In step 312, probe information in memory is updated to include an entry on the probe being initialized and to indicate that the probe's data is in alMatrixTopN(Terminal Count Mode) format. With the successful updating of memory in step 312 to reflect the presence and data table format of the detected probe which was just initialized, operation proceeds to step 322.

If, in step 310 it was determined that terminal alMatrixTopN table creation was unsuccessful, operation proceeds to step 314 instead of 312. In step 314 the management system 150 signals the probe being initialized to create an alMatrixTopN table using all count mode (as opposed to terminal count mode) counting.

If, in step 316, it is determined that all count Mode alMatrixTopN table creation was successful, e.g., by monitoring for a signal from the probe being initialized, operation proceeds to step 318. In step 318, probe information in memory is updated to include an entry on the probe being initialized and to indicate that the probe's data is in alMatrixTopN(all mode counting) format. With the successful updating of memory in step 318 to reflect the presence and data table format of the detected probe which was just initialized, operation proceeds to step 322.

If, in step 316, it is determined that all Mode alMatrixTopN table creation was unsuccessful operation proceeds to step 320. In step 320, probe information in memory is updated to include an entry on the probe being initialized and to indicate that the probe's data is in alMatrix format. With the successful updating of memory in step 320 to reflect the presence and data table format of the detected probe which was just initialized, operation proceeds to step 322.

If in step 306, it is determined that the probe being initialized does not support alMatrix tables, a network layer table must be selected for use. In such a case, operation proceeds from step 306 to step 324 wherein the management station 150 signals the probe being initialized to create an nlMatrixTopN table.

In step 326, a determination is made as to whether or not creation of the nlMatrixTopN table was successful.

If, in step 326, it is determined that nlMatrixTopN table creation was successful, e.g., by monitoring for a signal from the probe being initialized, operation proceeds to step 328. In step 328, probe information in memory is updated to include an entry on the probe being initialized and to indicate that the probe's data is in nlMatrixTopN format. With the successful updating of memory in step 328 to reflect the presence and data table format of the detected probe which was just initialized, operation proceeds to step 322.

If, in step 326, it is determined that all Mode nlMatrixTopN table creation was unsuccessful, operation proceeds to step 330. In step 330, probe information in memory is updated to include an entry on the probe being initialized and to indicate that the probe's data is in nlMatrix format. With the successful updating of memory in step 330 to reflect the presence and data table format of the detected probe which was just initialized, operation proceeds to step 322.

In step 322 a determination is made as to whether any probes detected in step 304 remain uninitialized. If there is another probe to be initialized, operation proceeds once again to step 306 wherein initialization of the next probe begins.

If, in step 322 it is determined that no probes remain to be initialized, operation proceeds to step 332 wherein the initialization routine is stopped pending its restart upon the next power up or resetting of the management station 150.

An exemplary probe information/data table 169 created in memory 150 via execution of the initialization routine is illustrated in FIG. 4B. Each detected probe 127, 137, 147 is identified in the table 169 as well as the format of the data table which is to be obtained from the identified probe when collecting network traffic data. Note that the table 169 includes temporary data table storage space used for storing data tables used as part of the format conversion operations discussed below. Note also that retrieved alMatrixTopN tables and nlMatrixTopN tables need not be stored for use in subsequent table format conversion operations since these tables are retrieved from the probe in the desired delta count format.

Figure 5:
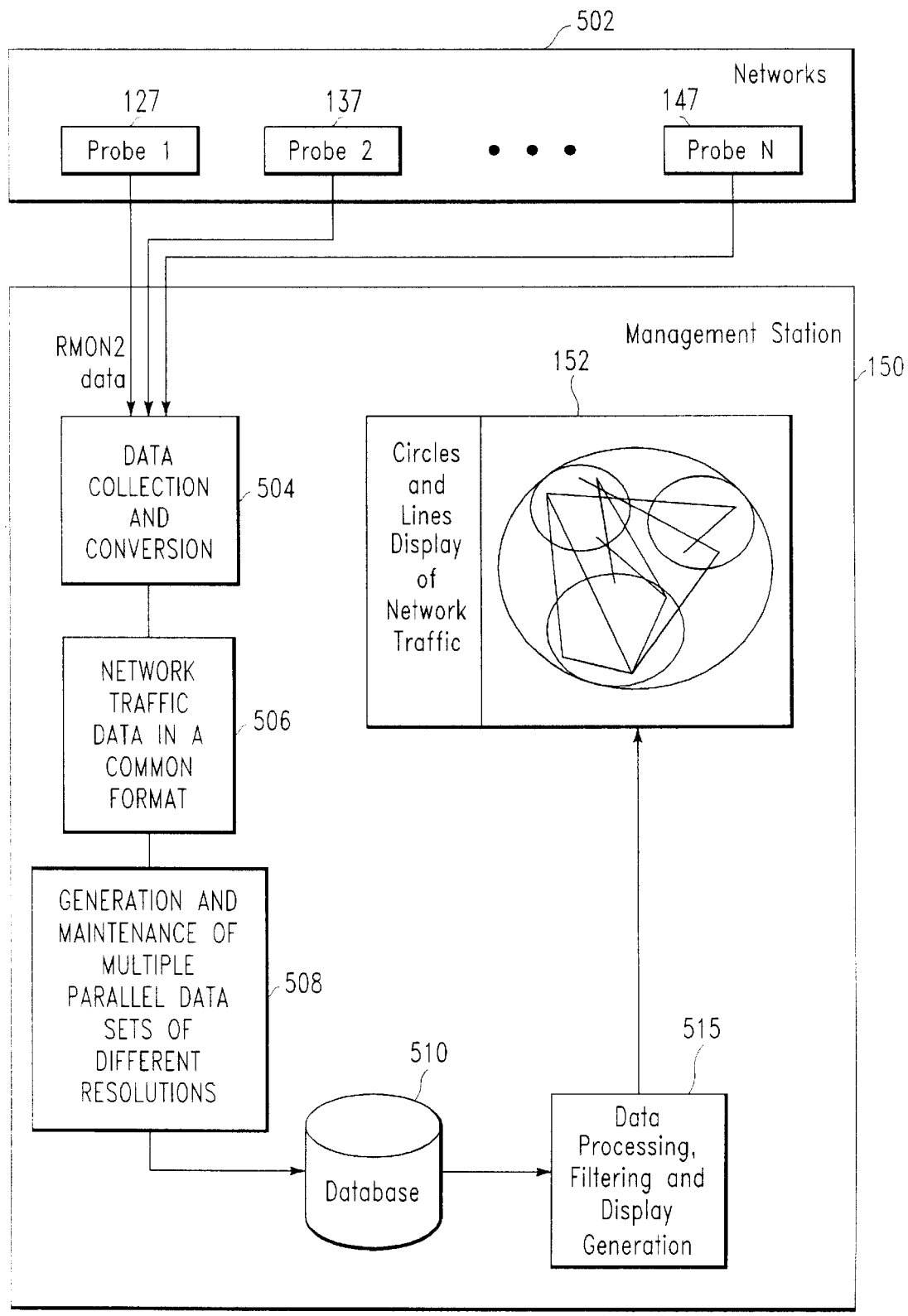
FIG. 5 is a diagram showing the processing of network conversation data in accordance with one exemplary embodiment of the present invention.

Once the management system 150 is initialized, collection, processing and storage of network data commences. FIG. 5 illustrates the collection, processing, storage and display of network traffic data in accordance with an exemplary embodiment of the present invention.

In FIG. 5 the group of networks 120, 130, 140, from which network traffic data is collected, are generally represented as a group by the block 502. The probes 127, 137, 147 which monitor each network or network segment serve as the source of network traffic data which is supplied to the management station 150. Network traffic data, in the form of a data table, is supplied to the management station from each probe 127, 137, 147 periodically in response to requests from the management station 150, for the information. The arrows, leading from the probes 127, 137, 147 to the data collection and conversion step 504 of the management station 150, represent the passing of the requested network traffic data to the management station 150.

Within the management station 150, there are several processing blocks 504, 508, 515 which are used to represent the various processing operations performed by the management station 150. In addition, there are several blocks, e.g., blocks 506, 510 and 152 which are used to illustrate the input and output data associated with the various processing operations.

The data collection and conversion step 504 represents data collection and formatting operations which are implemented using computer software, in the form of the data collection and conversion routines 164, to control the CPU 154.

In accordance with the processing performed in the data collection and conversion module 504, network traffic data is collected at periodic intervals from each of the detected probes and converted, in accordance with the present invention, into the preselected common format discussed above. The processing performed by the module 504 will be discussed in greater detail with regard to FIG. 6.

The output of the data collection and formatting step 504 is a set of network traffic data 506 which includes data from various probes that has been converted into the common data format of the present invention. The network traffic data 506 represents data from multiple probes collected during one periodic data collection operation involving the collection of data from probes 127, 137, 147. The set of network traffic data 506 serves as the input to a network traffic data set generation and maintenance module 508. As will be discussed in detail below, the data set generation and maintenance module 508 is responsible for generating multiple parallel sets of data which overlap in time but differ in terms of the resolution at which the network traffic data is stored in each data set. The group of data sets generated by the module 508 represent a network traffic database 510 extending in time over multiple periodic data collection cycles.

The data in network traffic database 510 can be accessed, e.g., in response to queries, processed, filtered and displayed and/or printed. Data processing, filtering and display generation step 515, which may be implemented by executing the routines 168 on the CPU 154, is responsible for performing such operations. The output of step 515 may take several forms including that of a printed document or a figure on the display device 152.

In the FIG. 5 embodiment, a circle and lines display of network traffic, generated in accordance with the present invention, is shown on the display 152. In one such embodiment, circles are used to represent computer networks or groups of computer networks. Points within a circle are used to represent devices located within the computer network represented by the surrounding circle. Lines between points are used to indicated detected conversations, while the thickness of a line is used to indicate the amount of data transferred during the monitored conversation. Note that in the FIG. 5 embodiment the outer circle on the display 152 represents the group of networks illustrated in FIG. 2 while each of the inner circles represents one of the computer networks 120, 130, 140.

Figure 6A:
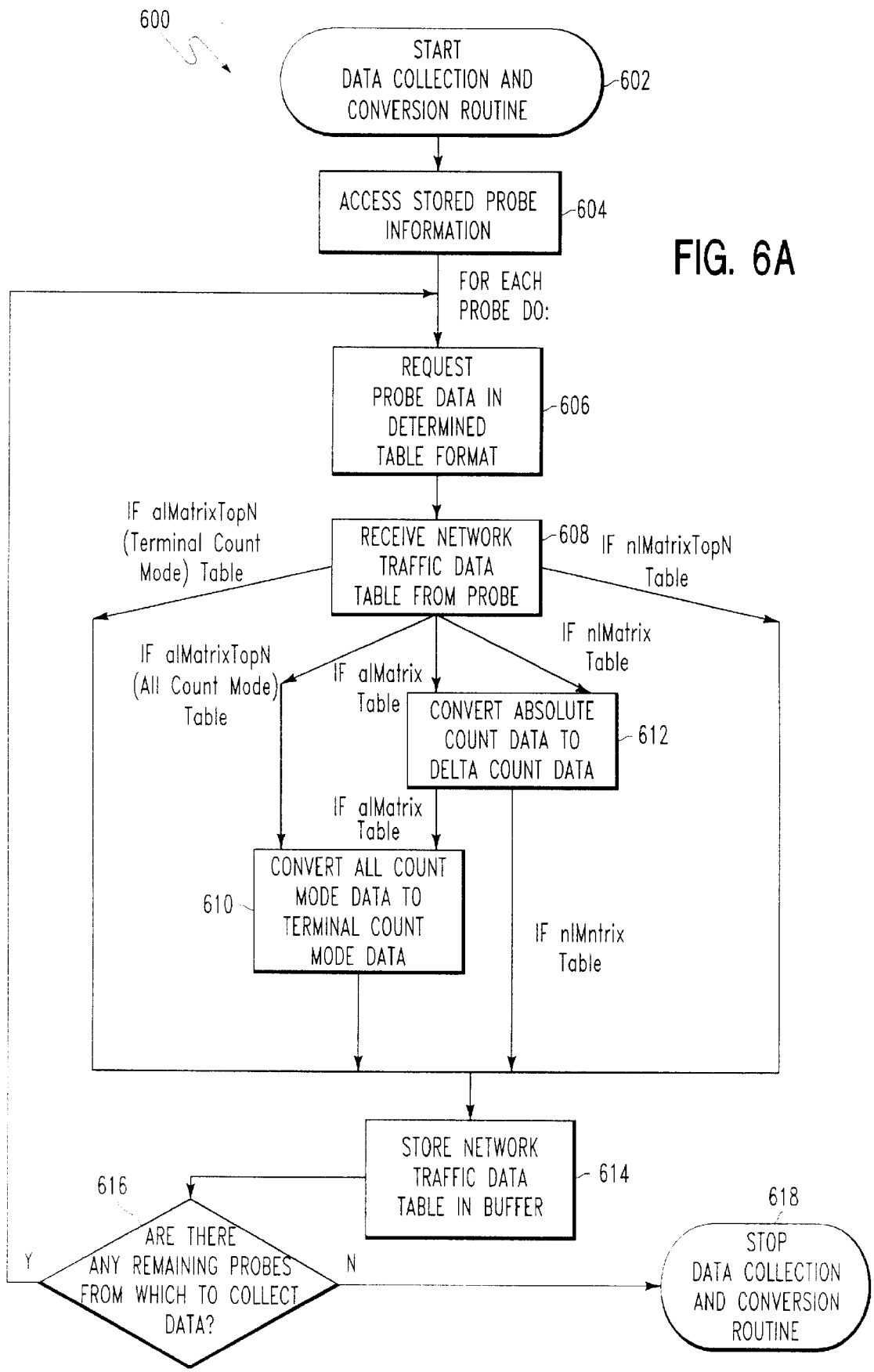
FIG. 6A illustrates a method of collecting network traffic data from probes and converting the collected data into a common data format.

FIG. 6A illustrates a method 600 corresponding, in one exemplary embodiment of the invention, to the data collection and conversion step 504. The routine 600 is executed periodically, e.g., every 30 minutes, by the CPU 154. As illustrated, the data collection and conversion routine 600 starts in step 602. During this step, the routine 600 is obtained from memory by the CPU 154 and executed.

From step 602 operation proceeds to step 604 wherein the stored information, included in table 169 about the probes present in the network and the network traffic data table format to be used with each probe, is accessed. Thus, the data collection and conversion routine 600 obtains from memory a list of probes that were detected during the previously discussed initialization process and information on the data table which the probe is to supply to the data collection routine.

Steps 606 through 614 are used to collect and process network traffic data corresponding to each individual probe that was detected during the initialization process.

In routine 600, operation proceeds from step 604 to step 606. In step 606 the processor 154 requests that the probe, from which data is to be collected, supply the network traffic data to the processor using the table format which was associated with the probe in the probe information/data table 169.

In step 608, the requested network traffic data table is received from the probe. The processing performed on the received network traffic data table to place it into the common data format used in accordance with the present invention depends on the type of data table received.

If in step 608 an alMatrixTopN(Terminal Count Mode) table is received, no format conversion operations are required. Accordingly, when an alMatrixTopN(Terminal Count Mode) table is received operation proceeds from step 608 directly to step 614 wherein the received data table, including time stamps indicating the time at which the network traffic occurred, is stored in a buffer 173 included in memory 162.

If in step 608 an alMatrixTopN(AllCount Mode) table is received, the data needs to be converted to terminal count mode to place it in the common format before storage in the buffer. In such a case, operation proceeds from step 608 to step 610. In step 610 AllCount Mode data is converted to terminal mode count data. Once the conversion to terminal count mode data is completed the resulting data table is stored in the buffer 173.

If in step 608 an alMatrix table is received, the absolute count data included therein needs to be converted to delta count data and all mode count data needs to be converted to terminal count mode data to place it in the common format before storage in the buffer. In such a case, operation proceeds from step 608 to step 612 and then to step 610. In step 612, absolute count data is converted to delta count data. In step 610 AllCount Mode data is converted to terminal count mode data. Once the conversion to terminal count mode data is completed operation proceeds to step 614 wherein the resulting data table is stored in the buffer 173.

If in step 608 an nlMatrix table is received, the absolute count data needs to be converted to delta count data to place it in the common format before storage in the buffer 173. Note that terminal count conversion need not be performed since application layer conversation information is not available in an nlMatrix table. In step 608 when an nlMatrix table is received, operation proceeds from step 608 to step 612. In step 612, absolute count data is converted to delta count data. Once the conversion of absolute count data to delta count data is completed, operation proceeds to step 614 wherein the resulting data table is stored in the buffer 173.

If in step 608 an nlMatrixTopN table is received, the data is already in delta count format. In addition, terminal count conversion need not be performed since application layer conversation information is not available from the received nlMatrixTopN table. In step 608 when an nlMatrixTopN table is received, operation proceeds directly to step 614 wherein the received data table is stored in the buffer 173.

From step 614, operation proceeds to step 616 wherein a determination is made as to whether or not there are any remaining probes from which data needs to be collected. If there are probes remaining, from which data has not been collected, operation proceeds from step 616 to step 606 wherein the process of collecting network traffic data from the next probe commences.

If, however, in step 616 it is determined that there are no more probes from which data needs to be collected, e.g., it is determined that network traffic data has been collected, processed and placed in the buffer for each of the probes identified in table 169, operation proceeds to step 618 wherein the data collection and conversion routine 600 is stopped.

At this point in time, the buffer 173 includes data tables for each identified probe 127, 137, 147 corresponding to the just completed data collection cycle.

By the time the data collection and conversion routine 600 stops, data from each of the network traffic probes 127, 137, 147 will have been converted, as required, into the common format used by the system of the present invention and stored in the buffer 173. The buffered network traffic data existing in a common format may then used, e.g., in the subsequent generation of a database of network traffic information.

The data collection and conversion routine 600 may be re-executed, each time it is desired to collect network traffic data, e.g., periodically at 30 minute or hourly intervals. To simplify absolute count data to delta count data conversion, in one embodiment, the period between data collections is selected to match the period for which the delta count is to be generated, i.e., the delta count represents the network traffic detected since the last time the network traffic data table was retrieved.

Figure 6B:
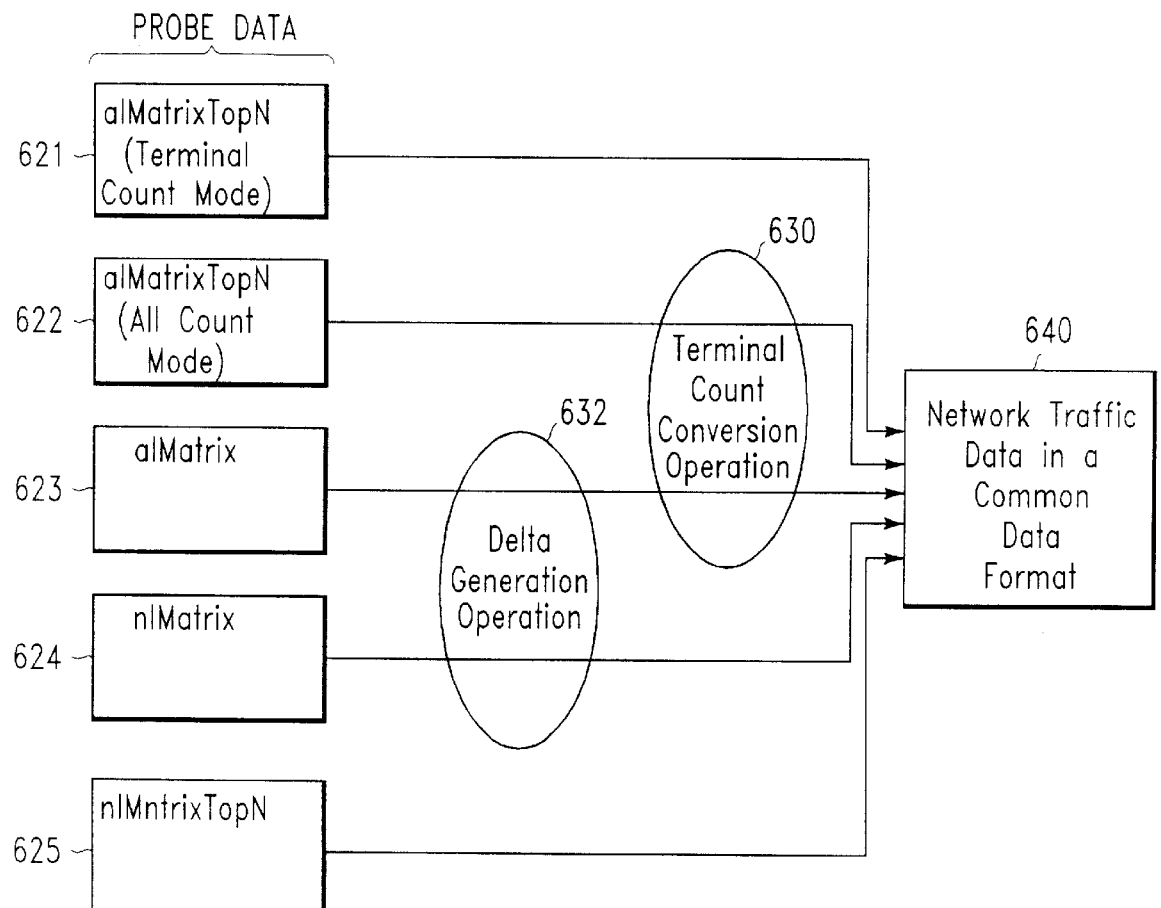
FIG. 6B illustrates the conversion of various RMON2 data tables into the common data format used in accordance with various embodiments of the present invention.

FIG. 6B is an additional illustration showing how received probe data, in the form of a network traffic data table, is processed by the data collection and conversion routine 600 to generate a network traffic data table 640 in the desired common data format (with the nlMatrixTopN and nlMatrix tables of course lacking the desired but unavailable application layer information). The five possible input data tables 621, 622, 623, 624 and 625 are shown on the left side of FIG. 6B. The ovals 630 and 632 represent terminal count conversion and delta generation operations, respectively. As illustrated, the alMatrixTopN(Terminal Count Mode) and nlMatrixTopN data tables are already in the desired common format. Thus, conversion operations need not be performed on input tables 621 and 625.

However, to place the alMatrixTopN(All Count Mode) data 622 in the common data format the terminal count conversion operation 630 is performed.

To place alMatrix data 623 in the common data format, both the delta generation operation 632 and the terminal count conversion operation 630 are performed.

To place nlMatrix data 624 into the common data format the delta generation operation 632 is performed.

Thus, by performing delta generation operations and/or terminal count conversion operations, it is possible to convert data tables 622, 623, and 624 into the desired common data format.

In accordance with an exemplary embodiment of the present invention, the conversion of absolute count data to delta count data may be performed in accordance with the following exemplary pseudo code:

```
Begin {delta count generation operation}
    if the received data is the first set of data received
    from the probe:
        Begin if
            Store the data table received from the probe
            in the temporary data table storage location
            associated with the specific probe from which
            the data being processed was collected;
            use the data included in the data table as
            delta data;
        end if
    else
        Begin else
            retrieve the previously stored data table
            from the temporary data table storage
            location associated with the specific probe
            from which the data table being processed was
            collected;
            store the most recently collected data table
            in said temporary data table storage
            location;
            from the entries in each row of the most
            recently collected data table, subtract the
            corresponding packet and byte counter values
            obtained from the corresponding row of the
            table retrieved from said temporary data
            table storage location, the resulting packet
            and byte counters being the delta count
            values for the network traffic table being
            generated; and
            incorporate the generated delta count values
            in the network traffic data table upon which
            the conversion operation is being performed
            thereby replacing the absolute count values
            from which they were generated;
            discard the network traffic data table
            retrieved from said temporary storage
            location;
        end else
end {delta count generation operation}
```

In the pseudo code set forth above, the delta time interval is the time interval between generation of the retrieved tables by the probe which supplies the data being processed.

As an example of a delta count conversion operation consider that a counter in a table corresponding to a specific probe had a value of 100 the first time the data table was retrieved from the specific probe, a value of 400 the next time the data table was retrieved from the same probe and a value of 600 the third time data was retrieved from the probe. In such a case, the delta counter value generated in accordance with the conversion process of the present invention for the interval corresponding to the time period between the first and second probe data retrievals would be 300 and the delta counter value generated for the second time interval corresponding to the period of time between the second and third probe data retrievals would be 200.

The conversion of all mode count data to terminal mode count data is required to convert data from alMatrix and alMatrixTopN (All Count Mode) tables into the common format used by the apparatus of the present invention. The conversion process of the present invention assumes that the data in the tables has already been converted into delta count values if it was not already in delta count format.

In accordance with the exemplary embodiment of the present invention, the conversion of all count mode data to terminal count mode data in step 610 and the terminal count conversion operation 630, involve performing the steps set forth in the following pseudo code:

```
Begin {Conversion of All Count mode data
    to Terminal Count mode Data}
    For each individual conversation for which there is data
    in the data table being processed do:
        Begin {do}
            determine the protocol hierarchy for the
            individual conversation;
            Starting at the network-layer protocols,
            subtract the counter values for each
            immediate (existing) child protocol from the
            child protocol's immediate (existing) parent
            counter value and store the result as the
            parent protocol's terminal count counter
            value.
            Repeat the preceding step for each child
            protocol until the entire protocol hierarchy
            has been traversed.
        End {do}
    end {Conversion of All Count mode data
        to Terminal Count mode Data}
```

AS an example of a terminal count conversion operation consider the exemplary protocol hierarchy discussed above in regard to FIG. 3. In order to convert all count mode data to terminal count mode data the following steps would be performed assuming the FIG. 3 protocol hierarchy:

1. The protocol hierarchy for the monitored conversation would be determined.
2. Start with the IP protocol counter values (packet and byte counter values). Subtract the corresponding counter values for the IP/TCP and IP/UDP/SNMP child protocols, from the IP parent protocol counter values. Note that the IP/UDP/SNMP protocol is considered to be an immediate child of the IP protocol because the IP/UDP protocol does not exist in the data retrieved from the probe in the FIG. 3 example (since the probe is not monitoring it), and so this makes IP the immediate (existing) parent of IP/UDP/SNMP. Store the resulting values as the terminal count IP protocol counter values.
3. Next, move onto the children of IP, namely IP/TCP and IP/UDP/SNMP. For IP/TCP, subtract counter values for the IP/TCP/FTP and IP/TCP/HTTP protocols from the corresponding IP/TCP counter values. Store the result as the IP/TCP terminal count counter values. For IP/UDP/SNMP there are no children, and so no processing to convert the counter values to terminal count values needs to be done.
4. Finally, the conversion process moves onto the children of IP/TCP, namely IP/TCP/FTP and IP/TCP/HTTP. As neither of these protocols have children in the hierarchy there is no processing to be done to convert the counter values to terminal count values.

Examples of the data collection, conversion (where required), and storage processes of the present invention will now be discussed. The following examples of how various packets and bytes seen for a single conversation would be counted in the various probe table formats, are based on the same contrived example conversation. The byte and packet counts for the example conversation, for one exemplary monitored time period, are set forth below in Table 1. In accordance with the present invention, the time period would correspond to the time period for which al and nl MatrixTopN tables were configured.

In the following example conversation, in the monitored time interval reflected in Table 1, the device with the IP address 123.45.67.89 was talking to the device with IP address 98.76.54.32 and the listed packet and byte counts were seen by a probe in regard to the conversation.

TABLE 1

| Protocol | Packets | Bytes |
|---|---|---|
| IP | 50 | 5000 |
| IP/TCP | 20 | 4000 |
| IP/TCP/FTP | 200 | 30000 |
| IP/TCP/HTTP | 10 | 1000 |
| IP/UDP/SNMP | 120 | 10000 |

The byte and packet counts for the example conversation shown in Table 1 include only the monitored protocols which were shown in the example hierarchy discussed earlier in regard to FIG. 3. Note that Table 1 reflects that the monitoring of UDP protocol has been turned off in the probe monitoring the conversation. Also note that in Table 1, e.g., IP/TCP represents all those packets which could only be decoded by the probe as far as the IP/TCP protocol—the IP/TCP count does not include the IP/TCP/FTP or IP/TCP/HTTP counts.

Examples of the processing performed in FIG. 6B for each of the five possible input table formats will now be provided based on the above discussed exemplary conversation.

1. alMatrixTopN(Terminal Count Mode) Table Processing Example

As discussed above, the alMatrixTopN (Terminal Count Mode) table monitors conversations at all the known application-layer protocols, and stores them, using delta counters, in a table which is ordered by the packet or byte counters (depending upon user-configuration). The counters in the alMatrixTopN (Terminal Count Mode) table work in Terminal Count Mode, and so a monitored packet increments only the counter of the "highest-level" protocol used in the packet.

In this example, we will assume that the user (or client program) has requested that the table be ordered by the byte counters. As the counters in this table work in Terminal Count Mode, the 200 IP/TCP/FTP packets, for example, increment only the IP/TCP/FTP packet counter by 200.

As a result, the alMatrixTopN(Terminal Count Mode) table for the exemplary conversation of TABLE 1 would look like this:

TABLE 2

| Network Layer Protocol | Source Address | Destination Address | Application Layer Protocol | Packets | Bytes |
|---|---|---|---|---|---|
| IP | 123.45.67.89 | 98.76.54.32 | IP/TCP/FTP | 200 | 30000 |
| IP | 123.45.67.89 | 98.76.54.32 | IP/UDP/SNMP | 120 | 10000 |
| IP | 123.45.67.89 | 98.76.54.32 | IP | 50 | 5000 |
| IP | 123.45.67.89 | 98.76.54.32 | IP/TCP | 20 | 4000 |
| IP | 123.45.67.89 | 98.76.54.32 | IP/TCP/HTTP | 10 | 1000 |

Note that as this is a MatrixTopN table, the packet and byte counter values are the total number of packets and bytes for the conversation in the monitored time interval.

For alMatrixTopN(Terminal Count Mode), the counters are already delta values in terminal count mode so the table, e.g., Table 2, received from a probe, is automatically in the common data format. Accordingly, in accordance with FIG. 6B the alMatrixTopN(Terminal Count Mode) table would be stored, unmodified, in the buffer 173.

2. alMatrixTopN(All Count Mode) Table Processing Example

The alMatrixTopN (All Count Mode) table monitors conversations at all the known application-layer protocols, and stores them, using delta counters, in a table which is ordered by the packet or byte counters (depending upon user-configuration). The counters in the alMatrixTopN (All Count Mode) table work in All Count Mode, and so a monitored packet increments the counters for all the protocol layers used in the packet.

Since the alMatrixTopN (All Count Mode) table works in All Count Mode, the monitored protocols increment the following counters for the exemplary conversation:

TABLE 3

| Protocol | Incremented Counters |
|---|---|
| IP | IP |
| IP/TCP | IP |
|  | IP/TCP |
| IP/TCP/FTP | IP |
|  | IP/TCP |
|  | IP/TCP/FTP |
| IP/TCP/HTTP | IP |
|  | IP/TCP |
|  | IP/TCP/HTTP |
| IP/UDP/SNMP | IP |
|  | IP/UDP/SNMP |

This means that, for example, the 200 IP/TCP/FTP packets increment the IP, the IP/TCP and the IP/TCP/FTP packet counters by 200.

Note that as the IP/UDP protocol is not being monitored in this example by the probe, an IP/UDP counter is not maintained. Accordingly, packets for the IP/UDP/SNMP protocol do not increment an IP/UDP counter.

In this example, we will assume that the user (or client program) has requested that the table be ordered by the byte counters. Since the counters work in All Count Mode, the 200 IP/TCP/FTP packets increment the IP, the IP/TCP and the IP/TCP/FTP packet counters by 200.

The resulting alMatrixTopN(All Count Mode) table would look like this:

TABLE 4A

| Network Layer Protocol | Source Address | Destination Address | Application Layer Protocol | Packets | Bytes |
|---|---|---|---|---|---|
| IP | 123.45.67.89 | 98.76.54.32 | IP | 400 | 50000 |
| IP | 123.45.67.89 | 98.76.54.32 | IP/TCP | 230 | 35000 |
| IP | 123.45.67.89 | 98.76.54.32 | IP/TCP/FTP | 200 | 30000 |
| IP | 123.45.67.89 | 98.76.54.32 | IP/UDP/SNMP | 120 | 10000 |
| IP | 123.45.67.89 | 98.76.54.32 | IP/TCP/HTTP | 10 | 1000 |

As this is a MatrixTopN table, the packet and byte counter values are the total number of packets and bytes for the conversation in the monitored time interval.

In order to place the alMatrixTopN(All Count Mode) table in the selected common format used by the present invention, a terminal count conversion operation is performed on the values in TABLE 4A as follows:

TABLE 4B

| Protocol | Formula | Packets | Bytes |
|---|---|---|---|
| IP | IP − IP/UDP/SNMP − IP/TCP | 400 − 230 − 120 = 50 | 50000 − 10000 − 35000 = 5000 |
| IP/UDP/SNMP | IP/UDP/SNMP | =120 | =10000 |
| IP/TCP | IP/TCP − IP/TCP/FTP − IP/TCP/HTTP | 230 − 200 − 10 = 20 | 35000 − 30000 − 1000 = 4000 |
| IP/TCP/FTP | IP/TCP/FTP | =200 | =30000 |
| IP/TCP/HTTP | IP/TCP/HTTP | =10 | =1000 |

After terminal count conversion, the counter values are now delta counter values expressed in terminal count mode format, giving the following table.

TABLE 4C

| Network Layer Protocol | Source Address | Destination Address | Application Layer Protocol | Packets | Bytes |
|---|---|---|---|---|---|
| IP | 123.45.67.89 | 98.76.54.32 | IP | 50 | 5000 |
| IP | 123.45.67.89 | 98.76.54.32 | IP/TCP | 20 | 4000 |
| IP | 123.45.67.89 | 98.76.54.32 | IP/TCP/FTP | 200 | 30000 |
| IP | 123.45.67.89 | 98.76.54.32 | IP/TCP/HTTP | 10 | 1000 |
| IP | 123.45.67.89 | 98.76.54.32 | IP/UDP/SNMP | 120 | 10000 |

Since the monitored probe data is now in the desired common format, Table 4C is ready for storage in buffer 173.

3. alMatrix Table Processing Example

The alMatrix table monitors conversations at all the known application-layer protocols, and stores them, using absolute counters, in a table which is ordered by network-layer protocol, source and destination addresses, and application-layer protocol. The counters in the alMatrix table work in All Count Mode, and so a monitored packet increments the counters for all the protocol layers used in the packet.

Since the alMatrix table works in All Count Mode, the monitored protocols increment the counters illustrated in Table 3.

As a result, the alMatrix table would look like this:

TABLE 5A

| Network Layer Protocol | Source Address | Destination Address | Application Layer Protocol | Packets | Bytes |
|---|---|---|---|---|---|
| IP | 123.45.67.89 | 98.76.54.32 | IP | 1200 | 150000 |
| IP | 123.45.67.89 | 98.76.54.32 | IP/TCP | 690 | 1000000 |
| IP | 123.45.67.89 | 98.76.54.32 | IP/TCP/FTP | 600 | 90000 |
| IP | 123.45.67.89 | 98.76.54.32 | IP/TCP/HTTP | 30 | 3000 |
| IP | 123.45.67.89 | 98.76.54.32 | IP/UDP/SNMP | 360 | 30000 |

Assuming the previously retrieved alMatrix Table from the same probe, was as follows:

TABLE 5B

| Network Layer Protocol | Source Address | Destination Address | Application Layer Protocol | Packets | Bytes |
|---|---|---|---|---|---|
| IP | 123.45.67.89 | 98.76.54.32 | IP | 800 | 100000 |
| IP | 123.45.67.89 | 98.76.54.32 | IP/TCP | 460 | 965000 |
| IP | 123.45.67.89 | 98.76.54.32 | IP/TCP/FTP | 400 | 60000 |
| IP | 123.45.67.89 | 98.76.54.32 | IP/TCP/HTTP | 20 | 2000 |
| IP | 123.45.67.89 | 98.76.54.32 | IP/UDP/SNMP | 240 | 20000 |

For the alMatrix Table 5A, the counter values are absolute values presented in all count mode. Accordingly, to place the alMatrix Table 5A into the desired common format, the counter values must be converted to delta values and all count mode values need to be converted to terminal count mode values.

In accordance with the present invention the first step is the generation of delta values. This is done by subtracting the counter values in the alMatrix Table 5B, which was received during the last collection operation, from the corresponding counter values found in the most recently received alMatrix Table 5A. Table 5B may be obtained from the temporary data table storage located in memory 169. The resulting table, Table 5C, which includes the delta values generated by the subtraction operation is shown below:

TABLE 5C

| Network Layer Protocol | Source Address | Destination Address | Application Layer Protocol | Packets | Bytes |
|---|---|---|---|---|---|
| IP | 123.45.67.89 | 98.76.54.32 | IP | 400 | 50000 |
| IP | 123.45.67.89 | 98.76.54.32 | IP/TCP | 230 | 35000 |
| IP | 123.45.67.89 | 98.76.54.32 | IP/TCP/FTP | 200 | 30000 |
| IP | 123.45.67.89 | 98.76.54.32 | IP/TCP/HTTP | 10 | 1000 |
| IP | 123.45.67.89 | 98.76.54.32 | IP/UDP/SNMP | 120 | 10000 |

After delta count conversion, the values in Table 5C still need to be put into terminal count mode. Terminal count conversion involves performing the subtractions shown in Table 5D.

TABLE 5D

| Protocol | Formula | Packets | Bytes |
|---|---|---|---|
| IP | IP − IP/UDP/SNMP − IP/TCP | 400 − 230 − 120 = 50 | 50000 − 10000 − 35000 = 5000 |
| IP/UDP/SNMP | IP/UDP/SNMP | =120 | =10000 |
| IP/TCP | IP/TCP − IP/TCP/FTP − IP/TCP/HTTP | 230 − 200 − 10 = 20 | 35000 − 30000 − 1000 = 4000 |
| IP/TCP/FTP | IP/TCP/FTP | =200 | =30000 |
| IP/TCP/HTTP | IP/TCP/HTTP | =10 | =1000 |

The terminal count conversion operation results in the following table:

TABLE 5E

| Network Layer Protocol | Source Address | Destination Address | Application Layer Protocol | Packets | Bytes |
|---|---|---|---|---|---|
| IP | 123.45.67.89 | 98.76.54.32 | IP | 50 | 5000 |
| IP | 123.45.67.89 | 98.76.54.32 | IP/TCP | 20 | 4000 |
| IP | 123.45.67.89 | 98.76.54.32 | IP/TCP/FTP | 200 | 30000 |
| IP | 123.45.67.89 | 98.76.54.32 | IP/TCP/HTTP | 10 | 1000 |
| IP | 123.45.67.89 | 98.76.54.32 | IP/UDP/SNMP | 120 | 10000 |

As Table 5E is now in the common data format, i.e., with counter values expressed as delta counter values in terminal count mode, Table 5E can be stored in the buffer 173.

4. nlMatrixTopN Table Processing Example

The nlMatrixTopN table monitors conversations at the network-layer protocols only, and stores them, using delta counters, in a table which is ordered by the packet or byte counters (depending upon user-configuration).

The nlMatrixTopN table monitors only network-layer protocols, and so will consider all of the packets given in the exemplary conversation to be IP packets, and so the stored table would be as follows:

TABLE 6

| Protocol | Source Address | Destination Address | Packets | Bytes |
|---|---|---|---|---|
| IP | 123.45.67.89 | 98.76.54.32 | 400 | 50000 |

Note that as this is a MatrixTopN table, the packet and byte counter values are the total number of packets and bytes for the conversation in the monitored time interval. Since the counter values in the nlMatrixTopN table are already delta counter values, no conversion processing needs to be performed on the nlMatrixTopN table and it is ready for storage in the buffer 173 as retrieved.

5. nlMatrix Table Processing Example

The nlMatrix table monitors conversations at the network-layer protocols only. It stores the counted byte and packet information, using absolute count values, in a table which is ordered by network-layer protocol and source and destination addresses.

As the nlMatrix table monitors only network-layer protocols, it will consider all of the packets given in the example conversation to be IP packets, and so the stored table would look like this:

TABLE 7A

| Protocol | Source Address | Destination Address | Packets | Bytes |
|---|---|---|---|---|
| IP | 123.45.67.89 | 98.76.54.32 | 1200 | 150000 |

Assuming the most recent previously retrieved nlMatrix Table from the same probe was as follows:

TABLE 7B

| Protocol | Source Address | Destination Address | Packets | Bytes |
|---|---|---|---|---|
| IP | 123.45.67.89 | 98.76.54.32 | 800 | 10000 |

In order to place the nlMatrix table in the desired common format, a delta conversion operation is performed. This involves subtracting the counter values from the current nlMatrix Table 7A from the corresponding counter values in the previously received Table 7B to generate a table as follows:

TABLE 7C

| Protocol | Source Address | Destination Address | Packets | Bytes |
|---|---|---|---|---|
| IP | 123.45.67.89 | 98.76.54.32 | 400 | 50000 |

Since Table 7C is now in the desired common format with delta counter values, it is ready for storage in the buffer 173.

As the result of the data collection and conversion routines discussed above, the data placed in the buffer 173 is in the common format rendering it suitable for use, e.g., in generating a network traffic database.

Figure 7:
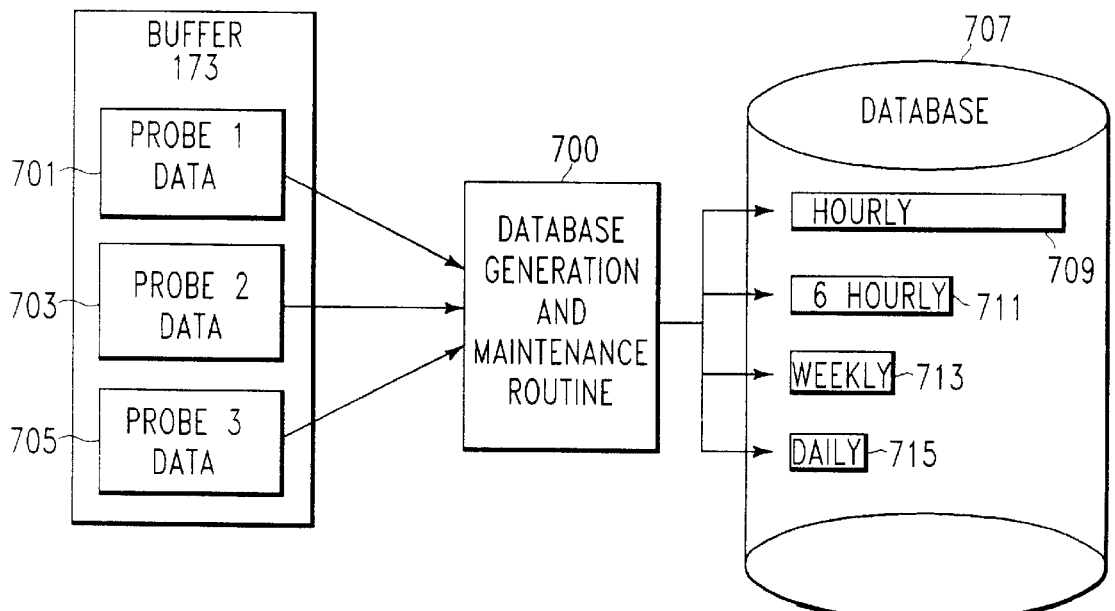
FIG. 7 is a block diagram illustrating the generation of a network traffic database including parallel sets of data of differing resolutions.

FIG. 7 illustrates how the network traffic data 701, 703, 705, from the first through third probes respectively, placed in the buffer 173, can be used to generate a network traffic database 707. In accordance with one embodiment of the present invention, the network traffic data 701, 703, 705 is processed by a database generation and maintenance routine 700 to generate a database 707. Unlike prior art databases which do not include data sets of different resolutions which overlap in time, the database 707 includes multiple resolutions of the same data in parallel, e.g., in hourly, 6 hourly, daily, and weekly data sets. These data sets are stored in corresponding FIFO data structures 709, 711, 713, 715, respectively. The database 707 may be stored on the data storage device 158.

The parallel, multi-resolution storage method of the present invention provides a relatively simple means of managing a network traffic database and limiting its size without the need for an aging process and the double buffering often associated with such processes.

While the amount of processing required to create and maintain multiple parallel sets of data in different resolutions may be slightly greater than systems which do not use parallel data sets, the processing associated with creating such a database is more constant than systems which involve aging processes. This is because the periodic load associated with the aging process is avoided when using the method of the present invention. A further benefit of this scheme is that the different resolutions of data are readily available which makes switching between different data resolutions fast and efficient when displaying data and or responding to administrator queries.

In the exemplary embodiment of FIG. 7, the disk space allocated to the database 707 is divided into 4 parts and assigned to the following fixed resolutions: hourly, 6-hourly, daily and weekly. As discussed above each row of a data table 701, 703, 705 corresponds to a monitored conversation and includes byte and packet count information. Time stamp information indicating the time the conversation was monitored is also included in the tables 701, 703, 705. As each row of data is read in from one of the tables 701, 703, 705, it is used to create or update an entry in each of the parallel data sets 709, 711, 713, 715. Within the generated parallel data sets, each record is used to represent a conversation between two hosts and the records are time aligned depending on the resolution: hourly on the hour; 6-hourly at 0600, 1200, 1800 and 2400 hrs; daily at 2400 hrs; and weekly at 2400 hrs on Saturday. Database records for the same time interval can be considered as being in the same "bucket". Thus, a bucket is a set of data storage records for storing network traffic data corresponding to the preselected unit of time used for the resolution to which the bucket corresponds.

Figure 8:
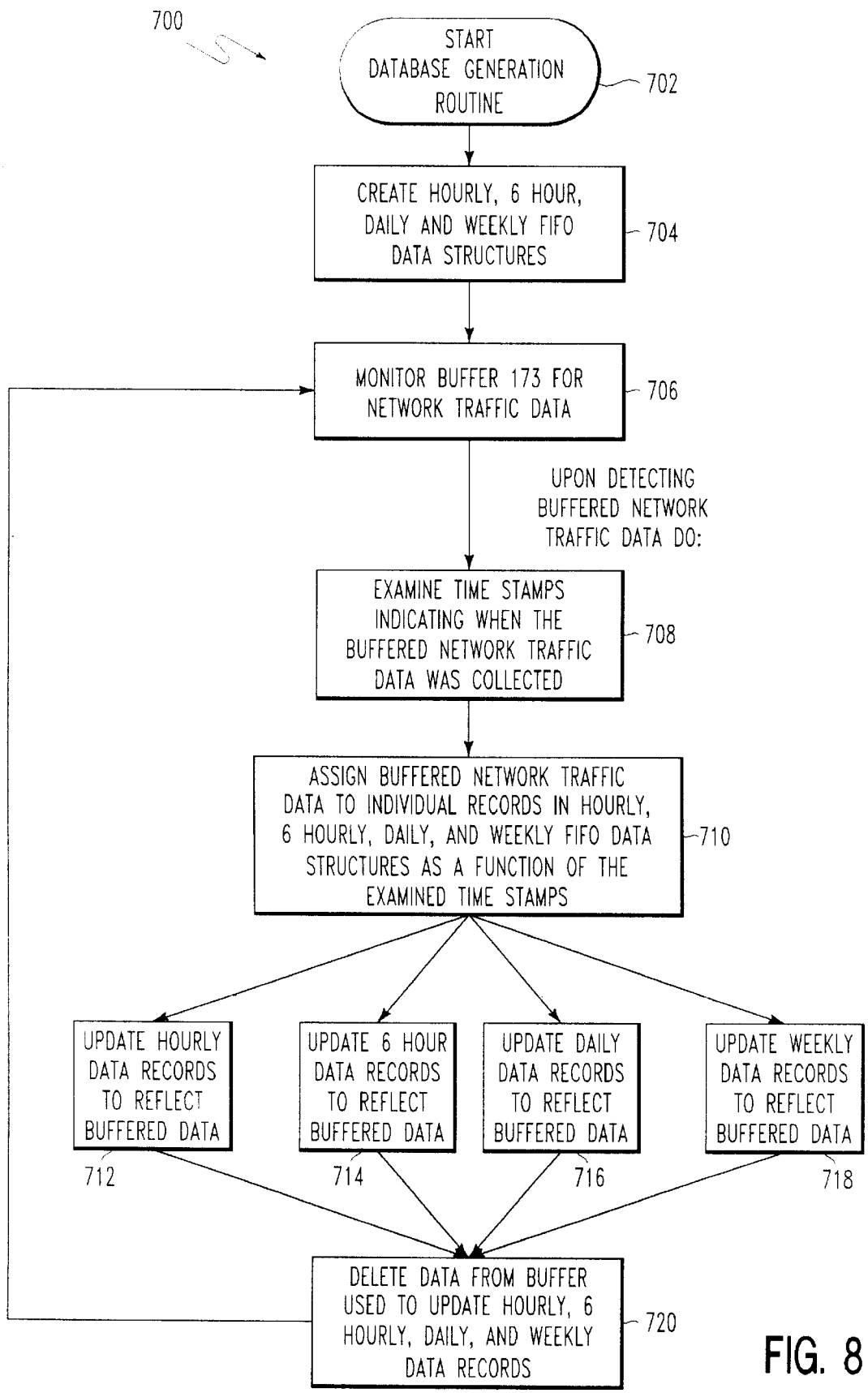
FIG. 8 is a flow chart illustrating a method of the present invention for generating a network traffic database including parallel sets of network traffic stored at different resolutions.

FIG. 8 illustrates the database generation and maintenance routine 700 of the present invention in greater detail. The illustrated routine 700 may be one of the parallel data set generation routines 166 stored in the management station's memory 162.

The routine 700 beings in step 702 wherein the database generation routine is started, e.g., by having the CPU 154 load and begin executing the routine 700. In embodiments where the routine 700 is implemented using parallel processing, it may be loaded into, and executed by the CPU 155 at the same time it is being loaded and executed by the CPU 154. In a parallel processing embodiment, the different CPUs 154, 155 are normally responsible for creating and maintaining, in parallel, data sets of different resolutions. For example, CPU 154 may be responsible for creating and maintaining the hourly and 6 hour network traffic data sets while the CPU 155 might be responsible for creating the daily and weekly network traffic data sets.

For the sake of simplicity the following discussion will assume that the routine 700 is executed by the processor 154. However, it is to be understood that, as discussed above, multi-processor implementations are possible.

Operation proceeds from step 702 to step 704 wherein the CPU 154 creates hourly, 6 hour, daily and weekly FIFO data structures, one for each of the different data set resolutions to be supported. Step 704 may involve, e.g., allocating data storage records to serve as buckets. For example, the hourly FIFO would comprise a plurality of buckets each corresponding to a one hour period of time. Each bucket may include several records or entries each corresponding to a different conversation/protocol pair. The daily FIFO would comprise a plurality of buckets each corresponding to a different one day period of time. As will be discussed below, as time progresses, each bucket in the FIFO is filled. When all the records in the FIFO are filled, the records in the oldest buckets are overwritten thereby insuring that the process can continue after the available storage space is used.

Once the FIFO data structures are created in step 704, operation proceeds to step 706. In step 706, the buffer 173 into which collected network traffic data is placed, is monitored for network traffic data. Upon detecting that network traffic data has been placed into buffer 173, operation proceeds to step 708. In step 708 the time stamps associated with the buffered data are examined. In step 710, the buffered network traffic data is assigned to be included in individual buckets in the FIFO structures as a function of the examined time stamps. Thus, data is placed in buckets, e.g., sets or groups of records corresponding to the basic unit of time supported, as a function of time stamps indicating the time period in which the network traffic was monitored. Accordingly, data collection and reporting delays encountered by the management station 150 do not negatively impact the accuracy of the created network traffic database.

Steps 712, 714, 716, 718 which are illustrated in parallel represent the updating of records included in the hourly, six hourly, daily and weekly FIFO data structures, respectively, using the same set of network traffic data. Steps 712, 714, 716, 718 are illustrated in parallel to show that they may be performed in parallel by one or more CPUs 154, 155.

Operation proceeds from steps 712, 714, 716 and 718 to step 720 wherein the data obtained from the buffer 173, used to update the hourly, six hourly, daily and weekly data records, is deleted. Operation then returns to monitoring step 706 so that the database updating process will be performed on a continuous basis until, e.g., the management station 150 is powered off or reset.

Figures 9, 10:
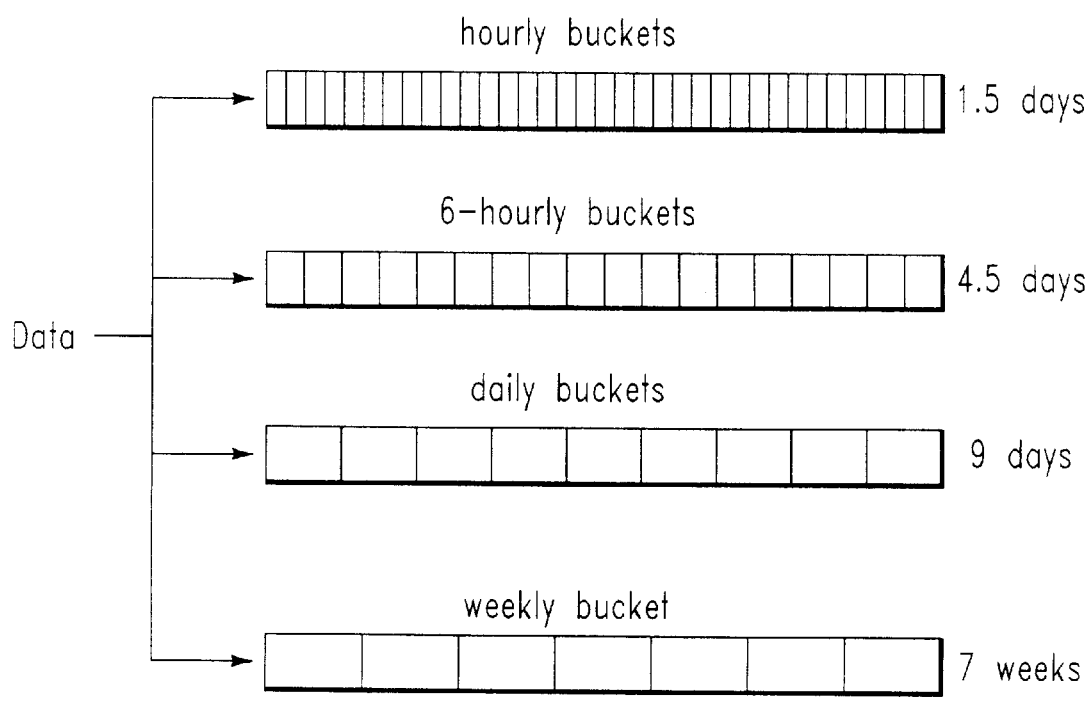
FIG. 9 illustrates a network traffic database including parallel data sets having an hourly and 6-hourly resolution.
FIG. 10 is a flow chart illustrating a network traffic database including parallel sets of network traffic information stored at different resolutions.

As a simple example of the generation of the hourly and 6 hourly data sets, consider hosts A through F illustrated in FIG. 2 as computers 21, 22, 23, 31, 32, 33, respectively. The boxes in FIG. 9 represent database records created from traffic between hosts A through F. Dashed lines are used to indicate different hourly time periods 901, 902, 903, 904, 905, 906 and a single 6 hourly time period 910. In FIG. 9, the range of numbers at the top of each time period is used to indicate the specific hour or hours included in the time period, the first and second letters in each box indicate the two hosts involved in the monitored conversation. In addition, the number in the box indicates the number of packets exchanged between the indicated hosts during the indicated time period.

The first hourly time period, beginning at hour 0 and ending at hour 1, corresponds to bucket 901. Two conversations were detected during this first hourly time period. A first conversation between devices A and B which involved 10 packets and a second conversation between devices A and E which involved 6 packets. The number of bytes, in addition to the number of packets, may also be stored in each record of the database 707.

Note that over a 6-hour period, the hourly resolution data set 920 has six "buckets", 901 through 906, corresponding to first through sixth hourly time periods and the 6-hourly data set has one bucket 910 corresponding to the single 6 hour time period. Note also that the 6-hour bucket 910 has more conversations and thus more entries than any one of the individual hourly buckets 901 through 906. However, the records in the six hour data set 922 are of a lower resolution than the hourly data set 920, since they do not include detailed hourly conversation data.

In accordance with one embodiment of the present invention, read access is limited to complete data records. Thus, data in a given time period may not be accessed until the record is fully complete, i.e., all the data from the system probes for the given time period has been included in the data record. By restricting access to completed data records, the presentation of incomplete data counts to an application or system user is avoided. In other embodiments, up to the minute data records are made available to the user. In such embodiments, a user may review, e.g., the most recent data in the weekly database despite the fact that the collection of the data for the current week is not yet complete.

As discussed above, as the data at a resolution fills the part of the storage space assigned to that particular resolution, the data structure used to store the data records at the particular resolution operates as a FIFO data structure. Accordingly, the oldest database records corresponding to the data set of the particular resolution will be reused to store new data. The hourly data set tends to be the first resolution to hit the database size limit when the available storage space for the database 707 is equally divided amongst the four supported resolutions since it grows the fastest. However, given limited available storage space, all the resolutions will reach their limit given sufficient operating time. FIG. 10 illustrates an exemplary steady station condition that may be reached after 7 weeks of operating one exemplary system 200. Note that in the FIG. 10 example, the database includes enough storage space to store hourly information for 1.5 days, 6-hourly information for 4.5 days, daily information for 9 days and weekly information for 7 weeks assuming the use of the same amount of storage for each of the different resolutions. Note that the actual time periods for a given system will depend on the number of conversations which are monitored and the actual amount of storage space allocated for the database 707.

What is claimed is:

1. A method of processing and storing data in a computer system including processor circuitry, and a data storage device, the method comprising the steps of:

storing first and second sets of records in separate first-in, first-out data structures, respectively, on the data storage device, the first and second sets of records being of different data resolutions and corresponding to overlapping periods of time;

operating the processor circuitry to receive data collected over a period of time; and operating the processor circuitry to update at least one record in each of the stored first and second sets of records with the received data such that a previous record included in each of the first and second data structures is replaced;

periodically collecting network traffic data, wherein the collected network traffic data includes byte and packet count information associated with each of a plurality of monitored conversations between devices included in the computer system;

storing the collected network traffic data in a buffer; and operating the processor circuitry to retrieve network traffic data from the buffer, the retrieved network traffic data being received by the processor circuitry;

wherein the step of operating the processor circuitry to update at least one record in each of the stored first and second sets of records includes the steps of:

updating a record corresponding to a first conversation in the first set of records; and updating a record corresponding to the first conversation in the second set of records.

2. The method of claim 1, further comprising the step of:

allocating fixed amounts of storage space on the data storage device for storing each one of the first and second first-in, first-out data structures used to store the first and second sets of records.

3. The method of claim 1, wherein the first set of records include hourly records and the second set of records includes daily records.

4. The method of claim 1, wherein the network traffic data stored in the buffer includes time stamp information indicating the period of time in which the network traffic data was collected; and wherein the step of operating the processor circuitry to update at least one record in each of the stored first and second sets of records includes the step of:

examining at least one time stamp included in the buffered network traffic data.

5. The method of claim 1, wherein the processor circuitry includes first and second central processing units, and wherein the step of operating the processor circuitry to update at least one record in each of the stored first and second sets of records includes the step of operating the first processor to update the first set of records while operating the second processor to update the second set of records.

6. The method of claim 1, wherein the computer system further includes a display device, the method further comprising the step of:

displaying data corresponding to overlapping periods of time at different resolutions on the display device.

7. A computer system for monitoring network traffic data comprising:

a memory;

a data storage device; and a processor to execute instructions stored in the memory, wherein the memory stores:

instructions to store first and second sets of records in separate first-in, first-out data structures, respectively, on the data storage device, the first and second sets of records being of different data resolutions and corresponding to overlapping periods of time;

instructions to receive data collected over a period of time;

instructions to update at least one record in each of the stored first and second sets of records with the received data such that a previous record included in each of the first and second data structures is replaced;

instructions to periodically collect network traffic data, wherein the collected network traffic data includes byte and packet count information associated with each of a plurality of monitored conversations between devices included in the computer system;

instructions to store the collected network traffic data in a buffer; and instructions to retrieve network traffic data from the buffer, the retrieved network traffic data being received by the processor;

wherein the instructions to update at least one record in each of the stored first and second sets of records include instructions to:

update a record corresponding to a first conversation in the first set of records; and update a record corresponding to the first conversation in the second set of records.

8. The computer system of claim 7, wherein the memory further comprises instructions to:

allocate fixed amounts of storage space on the data storage device for storing each one of the first and second first-in, first-out data structures used to store the first and second sets of records.

9. The computer system of claim 7, wherein the first set of records include hourly records and the second set of records includes daily records.

10. The computer system of claim 7, wherein the network traffic data stored in the buffer includes time stamp information indicating the period of time in which the network traffic data was collected; and wherein the instructions to update at least one record in each of the stored first and second sets of records include instructions to:

examine at least one time stamp included in the buffered network traffic data.

11. The computer system of claim 7, wherein the processor includes first and second central processing units, and wherein the instructions to operate the processor to update at least one record in each of the stored first and second sets of records includes instructions to operate the first processor to update the first set of records while operating the second processor to update the second set of records.

12. The computer system of claim 7 further including a display device, the memory further comprising instructions to:

display data corresponding to overlapping periods of time at different resolutions on the display device.

13. A computer program product system for monitoring network traffic data, said computer program product comprising a computer usable medium having computer readable program code means embodied in said medium for causing a processor in a computer to:

store first and second sets of records in separate first-in, first-out data structures, respectively, on a data storage device, the first and second sets of records being of different data resolutions and corresponding to overlapping periods of time;

receive data collected over a period of time;

update at least one record in each of the stored first and second sets of records with the received data such that a previous record included in each of the first and second data structures is replaced;

periodically collect network traffic data, wherein the collected network traffic data includes byte and packet count information associated with each of a plurality of monitored conversations between devices included in the computer system;

store the collected network traffic data in a buffer; and retrieve network traffic data from the buffer, the retrieved network traffic data being received by the processor;

wherein the causing the processor to update at least one record in each of the stored first and second sets of records includes:

updating a record corresponding to a first conversation in the first set of records; and updating a record corresponding to the first conversation in the second set of records.

14. The computer program product of claim 13, wherein the computer readable program code means further causes the processor to:

allocate fixed amounts of storage space on the data storage device for storing each one of the first and second first-in, first-out data structures used to store the first and second sets of records.

15. The computer program product of claim 13, wherein the first set of records include hourly records and the second set of records includes daily records.

16. The computer program product of claim 13, wherein the network traffic data stored in the buffer includes time stamp information indicating the period of time in which the network traffic data was collected; and wherein the computer readable program code means to update at least one record in each of the stored first and second sets of records includes computer readable program code means to examine at least one time stamp included in the buffered network traffic data.

17. The computer program product of claim 13, wherein the processor includes first and second central processing units, and wherein the computer readable program code means to update at least one record in each of the stored first and second sets of records includes computer readable program code means to operate the first processor to update the first set of records while operating the second processor to update the second set of records.

18. The computer program product of claim 13 wherein the computer readable program code means further causes the computer to display data corresponding to overlapping periods of time at different resolutions on a display device.

* * * * *